United States Patent
Kusaka

(10) Patent No.: US 8,063,978 B2
(45) Date of Patent: Nov. 22, 2011

(54) IMAGE PICKUP DEVICE, FOCUS DETECTION DEVICE, IMAGE PICKUP APPARATUS, METHOD FOR MANUFACTURING IMAGE PICKUP DEVICE, METHOD FOR MANUFACTURING FOCUS DETECTION DEVICE, AND METHOD FOR MANUFACTURING IMAGE PICKUP APPARATUS

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 670 days.

(21) Appl. No.: 12/100,779

(22) Filed: Apr. 10, 2008

(65) Prior Publication Data

US 2008/0291311 A1 Nov. 27, 2008

(30) Foreign Application Priority Data

Apr. 11, 2007 (JP) ................................. 2007-103761

(51) Int. Cl.
*H04N 5/232* (2006.01)
*H04N 5/238* (2006.01)
*H01L 21/00* (2006.01)

(52) U.S. Cl. ............................ 348/345; 348/363; 438/48

(58) Field of Classification Search .................. 348/345, 348/362, 363, 372–376; 396/99; 438/48, 438/51, 57

See application file for complete search history.

(56) References Cited

U.S. PATENT DOCUMENTS

| 6,819,360 B1 * | 11/2004 | Ide et al. ........................ 348/340 |
| 2002/0125409 A1 * | 9/2002 | Nagano ...................... 250/208.1 |
| 2008/0074534 A1 | 3/2008 | Kusaka |
| 2008/0084483 A1 | 4/2008 | Kusaka |

FOREIGN PATENT DOCUMENTS

JP 1-216306 8/1989

* cited by examiner

*Primary Examiner* — Trung Diep
(74) *Attorney, Agent, or Firm* — Ditthavong Mori & Steiner, P.C.

(57) ABSTRACT

An image pickup device includes a pixel unit which has first pixels and second pixels. A first photoelectric conversion unit is configured to generate charges corresponding to light incident upon each of the first pixels. A first control unit is connected to the first photoelectric conversion unit and configured to control the first photoelectric conversion unit. A second photoelectric conversion unit is configured to generate charges corresponding to light incident upon each of the second pixels. The second photoelectric conversion unit is smaller than the first photoelectric conversion unit. A second control unit is connected to the second photoelectric conversion unit and configured to control the second photoelectric conversion unit. The second control unit is arranged in a space which is generated due to a size difference between the first photoelectric conversion unit and the second photoelectric conversion unit.

43 Claims, 31 Drawing Sheets

IMAGE PICKUP DEVICE, FOCUS DETECTION DEVICE, IMAGE PICKUP APPARATUS, METHOD FOR MANUFACTURING IMAGE PICKUP DEVICE, METHOD FOR MANUFACTURING FOCUS DETECTION DEVICE, AND METHOD FOR MANUFACTURING IMAGE PICKUP APPARATUS

CROSS-REFERENCE TO RELATED APPLICATIONS

The present application claims priority under 35 U.S.C. §119 to Japanese Patent Application No. 2007-103761, filed Apr. 11, 2007. The contents of this application are incorporated herein by reference in their entirety.

BACKGROUND OF THE INVENTION

1. Field of the Invention

The present invention relates to an image pickup device, a focus detection device, an image pickup apparatus, a method for manufacturing an image pickup device, a method for manufacturing a focus detection device, and a method of manufacturing an image pickup apparatus.

2. Discussion of the Background

Japanese Unexamined Patent Application Publication No. 01-216306 discloses a focus detection device designed to realize the image pickup function and the focus detection function with one image pickup device by using an image pickup device of the type that pixels for detecting a focus based on the pupil-split phase difference detection method are arranged at a screen center. The contents of this publication are incorporated herein by reference in their entirety.

However, in an image pickup device, such as a CMOS, in which charge accumulation timing differs depending on a position where a pixel is arranged, the charge accumulation timings are often not the same for all the focus detection pixels. Accordingly, focus detection accuracy determined based on output signals from the focus detection pixels deteriorates for an object (subject) which moves during a charge accumulation period.

SUMMARY OF THE INVENTION

According to one aspect of the present invention, an image pickup device includes a pixel unit, a first photoelectric conversion unit, a first control unit, a second photoelectric conversion unit and a second control unit. The pixel unit includes first pixels and second pixels. The first photoelectric conversion unit is configured to generate charges corresponding to light incident upon each of the first pixels. The first control unit is connected to the first photoelectric conversion unit and configured to control the first photoelectric conversion unit. The second photoelectric conversion unit is configured to generate charges corresponding to light incident upon each of the second pixels. The second photoelectric conversion unit is smaller than the first photoelectric conversion unit. The second control unit is connected to the second photoelectric conversion unit and configured to control the second photoelectric conversion unit. The second control unit is arranged in a space which is generated due to a size difference between the first photoelectric conversion unit and the second photoelectric conversion unit.

According to another aspect of the present invention, a focus detection device includes a focus detection unit and an image pickup device which includes a pixel unit, a first photoelectric conversion unit, a first control unit, a second photoelectric conversion unit and a second control unit. The pixel unit includes first pixels and second pixels. The first photoelectric conversion unit is configured to generate charges corresponding to light incident upon each of the first pixels. The first control unit is connected to the first photoelectric conversion unit and configured to control the first photoelectric conversion unit. The second photoelectric conversion unit is configured to generate charges corresponding to light incident upon each of the second pixels. The second photoelectric conversion unit is smaller than the first photoelectric conversion unit. The second control unit is connected to the second photoelectric conversion unit and configured to control the second photoelectric conversion unit. The second control unit is arranged in a space which is generated due to a size difference between the first photoelectric conversion unit and the second photoelectric conversion unit. The second pixels include a first focus detection pixel and a second focus detection pixel which are arranged next to each other. The second photoelectric conversion unit in the first focus detection pixel is configured to receive one of a pair of light beams passed through an exit pupil of an imaging optical system. The second photoelectric conversion unit in the second focus detection pixel is configured to receive another of the pair of light beams passed through the exit pupil of the imaging optical system. The focus detection unit is configured to detect a focus adjusting state of the imaging optical system based on signals output from the second photoelectric conversion units of the second pixels.

According to another aspect of the present invention, an image pickup apparatus includes a focus detection device, a focus adjustment unit configured to perform focus adjustment of the imaging optical system based on the focus adjusting state detected by the focus detection device, and a recording unit configured to record an image captured by the image pickup device. The focus detection device includes a focus detection unit and an image pickup device which includes a pixel unit, a first photoelectric conversion unit, a first control unit, a second photoelectric conversion unit and a second control unit. The pixel unit includes first pixels and second pixels. The first photoelectric conversion unit is configured to generate charges corresponding to light incident upon each of the first pixels. The first control unit is connected to the first photoelectric conversion unit and configured to control the first photoelectric conversion unit. The second photoelectric conversion unit is configured to generate charges corresponding to light incident upon each of the second pixels. The second photoelectric conversion unit is smaller than the first photoelectric conversion unit. The second control unit is connected to the second photoelectric conversion unit and configured to control the second photoelectric conversion unit. The second control unit is arranged in a space which is generated due to a size difference between the first photoelectric conversion unit and the second photoelectric conversion unit. The second pixels include a first focus detection pixel and a second focus detection pixel which are arranged next to each other. The second photoelectric conversion unit in the first focus detection pixel is configured to receive one of a pair of light beams passed through an exit pupil of an imaging optical system. The second photoelectric conversion unit in the second focus detection pixel is configured to receive another of the pair of light beams passed through the exit pupil of the imaging optical system. The focus detection unit is configured to detect a focus adjusting state of the imaging optical system based on signals output from the second photoelectric conversion units of the second pixels.

According to the other aspect of the present invention, a method for manufacturing an image pickup device includes providing a pixel unit having first pixels and second pixels; providing a first photoelectric conversion unit configured to generate charges corresponding to light incident upon each of the first pixels; providing a first control unit configured to control the first photoelectric conversion unit; providing a second photoelectric conversion unit configured to generate charges corresponding to light incident upon each of the second pixels, the second photoelectric conversion unit being smaller than the first photoelectric conversion unit; and providing a second control unit configured to control the second photoelectric conversion unit, the second control unit being arranged in a space which is generated due to a size difference between the first photoelectric conversion unit and the second photoelectric conversion unit.

According to further aspect of the present invention, a method for manufacturing a focus detection device includes providing a pixel unit having first pixels and second pixels; providing a first photoelectric conversion unit configured to generate charges corresponding to light incident upon each of the first pixels; providing a first control unit configured to control the first photoelectric conversion unit; providing a second photoelectric conversion unit configured to generate charges corresponding to light incident upon each of the second pixels, the second photoelectric conversion unit being smaller than the first photoelectric conversion unit; providing a second control unit configured to control the second photoelectric conversion unit, the second control unit being arranged in a space which is generated due to a size difference between the first photoelectric conversion unit and the second photoelectric conversion unit; and providing a focus detection unit configured to detect a focus adjusting state of the imaging optical system based on signals output from the second photoelectric conversion units of the second pixels.

According to further aspect of the present invention, a method of manufacturing an image pickup apparatus includes providing a pixel unit having first pixels and second pixels; providing a first photoelectric conversion unit configured to generate charges corresponding to light incident upon each of the first pixels; providing a first control unit configured to control the first photoelectric conversion unit; providing a second photoelectric conversion unit configured to generate charges corresponding to light incident upon each of the second pixels, the second photoelectric conversion unit being smaller than the first photoelectric conversion unit; providing a second control unit configured to control the second photoelectric conversion unit, the second control unit being arranged in a space which is generated due to a size difference between the first photoelectric conversion unit and the second photoelectric conversion unit; providing a focus detection unit configured to detect a focus adjusting state of the imaging optical system based on signals output from the second photoelectric conversion units of the second pixels; providing a focus adjustment unit configured to perform focus adjustment of the imaging optical system based on the focus adjusting state detected by the focus detection device; and providing a recording unit configured to record an image captured by the image pickup device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
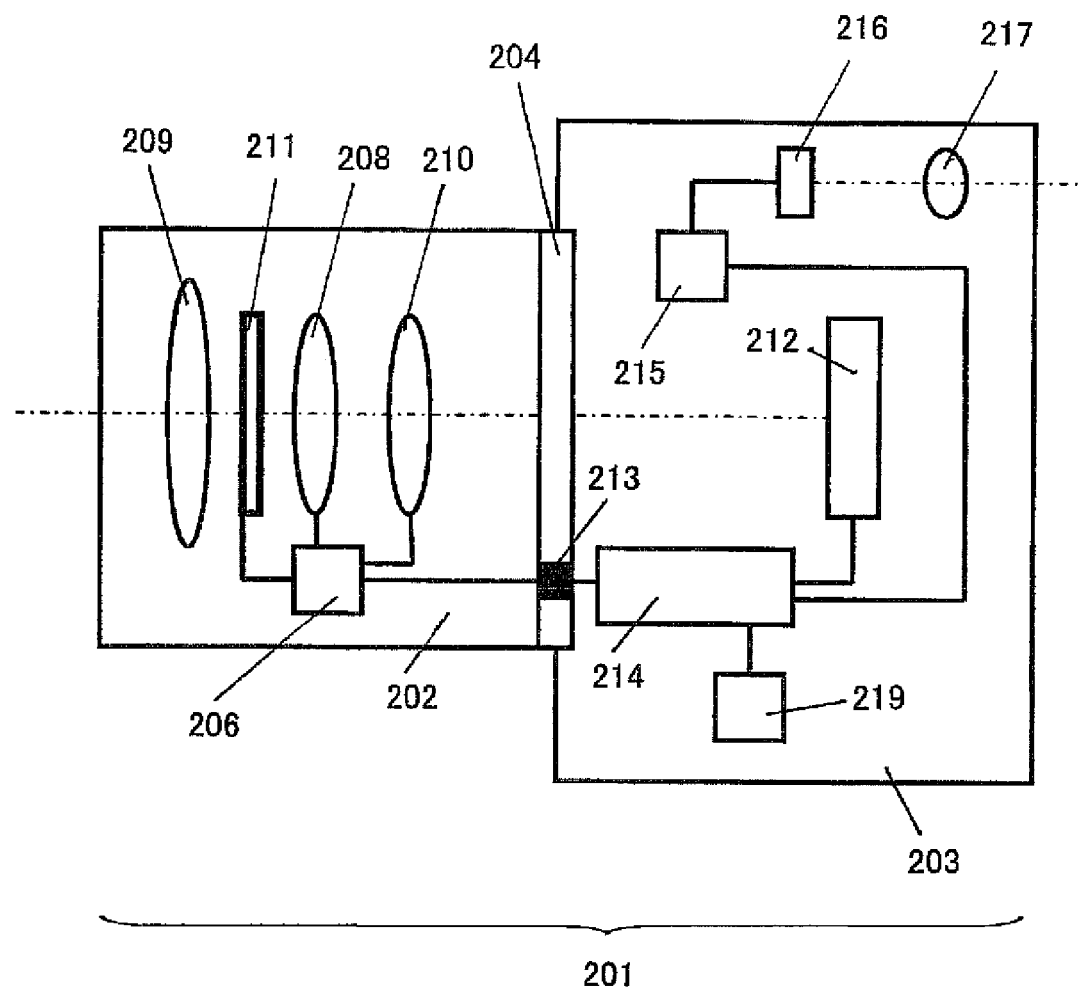
FIG. 1 is a cross-sectional view showing a construction of a camera according to one embodiment of the present invention.

The embodiments will now be described with reference to the accompanying drawings, wherein like reference numerals designate corresponding or identical elements throughout the various drawings.

An image pickup apparatus including a focus detection device, according to one embodiment of the present invention, will be described in connection with, for example, a digital still camera with an interchangeable lens. FIG. 1 is a cross-sectional view showing a construction of the camera according to one embodiment. A digital still camera 201 according to the one embodiment is made up of an interchangeable lens 202 and a camera body 203. The interchangeable lens 202 is mounted to the camera body 203 through a mount unit 204.

The interchangeable lens 202 includes a lens 209, a zooming lens 208, a focusing lens 210, a diaphragm 211, a lens drive controller 206, etc. The lens drive controller 206 is constituted by a microcomputer, a memory, a drive control circuit, etc., which are not illustrated. The lens drive controller 206 performs not only drive control for focus adjustment of the focusing lens 210 and aperture size adjustment of the diaphragm 211, and status detection of the zooming lens 2018, the focusing lens 210 and the diaphragm 211, but also transmission of lens information and reception of camera information via communication with a body drive controller 214 (described later). The diaphragm 211 has an aperture of which size is variable about an optical axis being a center in order to adjust the amount of light and the amount of defocus.

The camera body 203 includes an image pickup device 212, the body drive controller 214, a liquid-crystal display device drive circuit 215, a liquid crystal display device 216, an eyepiece 217, a memory card 219, etc. In the image pickup device 212, image pickup pixels are arranged in a two-dimensional array and focus detection pixels are incorporated in an area corresponding to a focus detection position.

The body drive controller 214 is constituted by a microcomputer, a memory, a drive control circuit, etc. The body drive controller 214 performs not only drive control of the image pickup device 212, read of image signals and focus detection signals, focus detection calculations based on the focus detection signals, and focus adjustment of the interchangeable lens 202 in a repeated manner, but also processing and recording of the image signals, operation control of the camera, etc. Further, the body drive controller 214 communicates with the lens drive controller 206 through an electrical contact 213 to receive the lens information and to transmit the camera information (such as the defocus amount and the aperture value).

The liquid crystal display device 216 functions as a liquid crystal viewfinder (EVF: electric viewfinder). The liquid-crystal display device drive circuit 215 displays, on the liquid crystal display device 216, a walk-through image (live review image) captured by the image pickup device 212. A photographer can observe the walk-through image through the eyepiece 217. The memory card 219 serves as an image storage for storing images captured by the image pickup device 212.

An object image is formed on a light receiving surface of the image pickup device 212 by a light beam having passed through the interchangeable lens 202. The object image is subjected to photoelectric conversion in the image pickup device 212, and the resulting image signals and focus detection signals are sent to the body drive controller 214.

Based on the focus detection signals from the focus detection pixels of the image pickup device 212, the body drive controller 214 calculates the defocus amount and sends the calculated defocus amount to the lens drive controller 206. Further, the body drive controller 214 processes the image signals from the image pickup device 212 and stores them in the memory card 219, while it sends walk-through image signals from the image pickup device 212 to the liquid-crystal display drive circuit 215 and displays the walk-through image on the liquid crystal display device 216. In addition, the body drive controller 214 sends diaphragm control information to the lens drive controller 206 for aperture control of the diaphragm 211.

The lens drive controller 206 changes the lens information depending on the focusing state, the zooming state, the diaphragm setting state, the diaphragm aperture F-number, etc. More specifically, the lens drive controller 206 detects respective positions of the zooming lens 208 and the focusing lens 210 and the aperture value of the diaphragm 211, thus calculating the lens information based on the detected lens positions and the aperture value. As an alternative, the lens drive controller 206 selects, from a previously prepared lookup table, the lens information corresponding to the detected lens positions and the aperture value.

The lens drive controller 206 calculates a lens drive amount based on the received defocus amount and drives the focusing lens 210 to an in-focus point depending on the calculated lens drive amount. In addition, the lens drive controller 206 drives the diaphragm 211 depending on the received aperture value.

One 202 of interchangeable lenses having various kinds of imaging optical systems can be mounted to the camera body 203 through the mount unit 204. The camera body 203 detects a focus adjusted state of the interchangeable lens 202 based on outputs from the focus detection pixels which are incorporated in the image pickup device 212.

Figure 2:
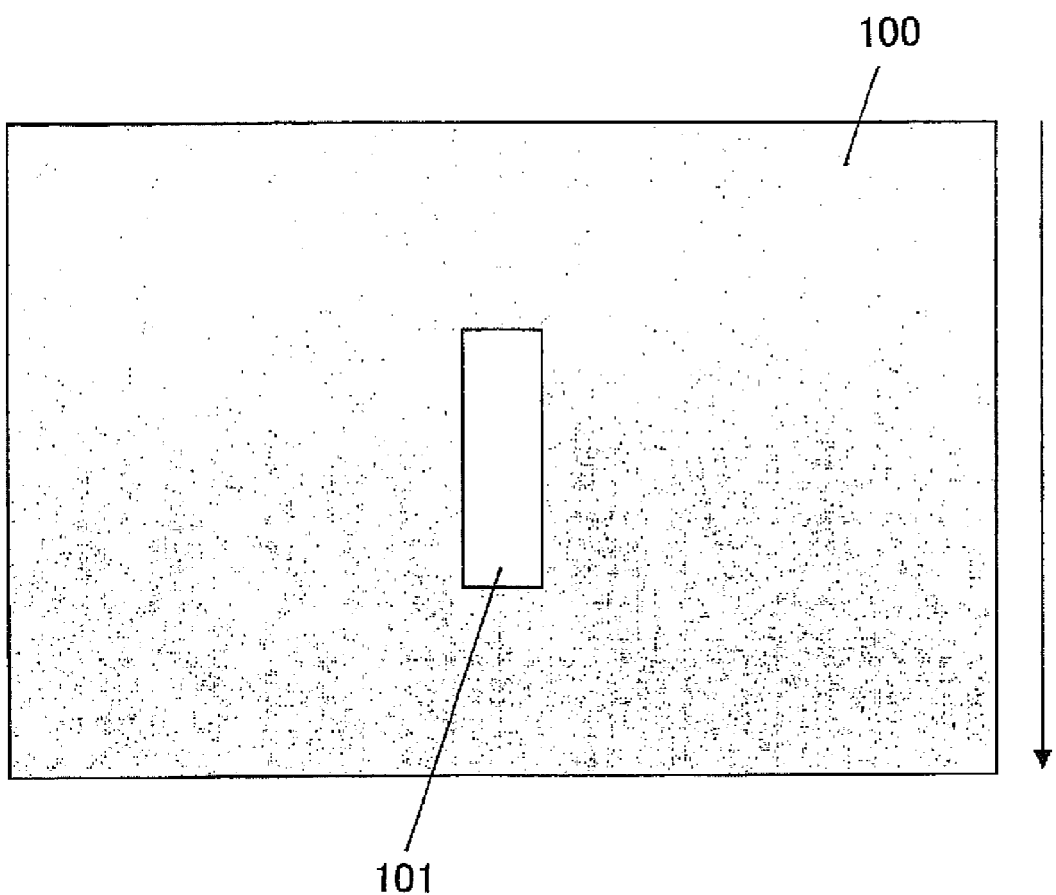
FIG. 2 illustrates a focus detection position on a shooting screen according to the one embodiment.

FIG. 2 shows a focus detection position on a shooting screen according to the one embodiment. In other words, FIG. 2 illustrates a region where a line of focus detection pixels perform image sampling on the shooting screen at the time of focus detection (i.e., a focus detection area or a focus detection position). In the one embodiment, a focus detection area 101 is arranged at a center of a shooting screen 100 to extend in the vertical direction. The focus detection pixels are linearly arrayed in the lengthwise direction of the focus detection area 101 shown as having a rectangular shape. The image pickup device 212 according to the one embodiment, shown in FIG. 1, is a CMOS image sensor (Complementary Metal Oxide-film Semiconductor image sensor). In the CMOS image sensor, because charge accumulation control is performed in accordance with the rolling shutter method for each of pixel array lines extending in the horizontal direction, exposure timing (charge accumulation timing) is shifted on the shooting screen in the direction of arrow.

Figure 3:
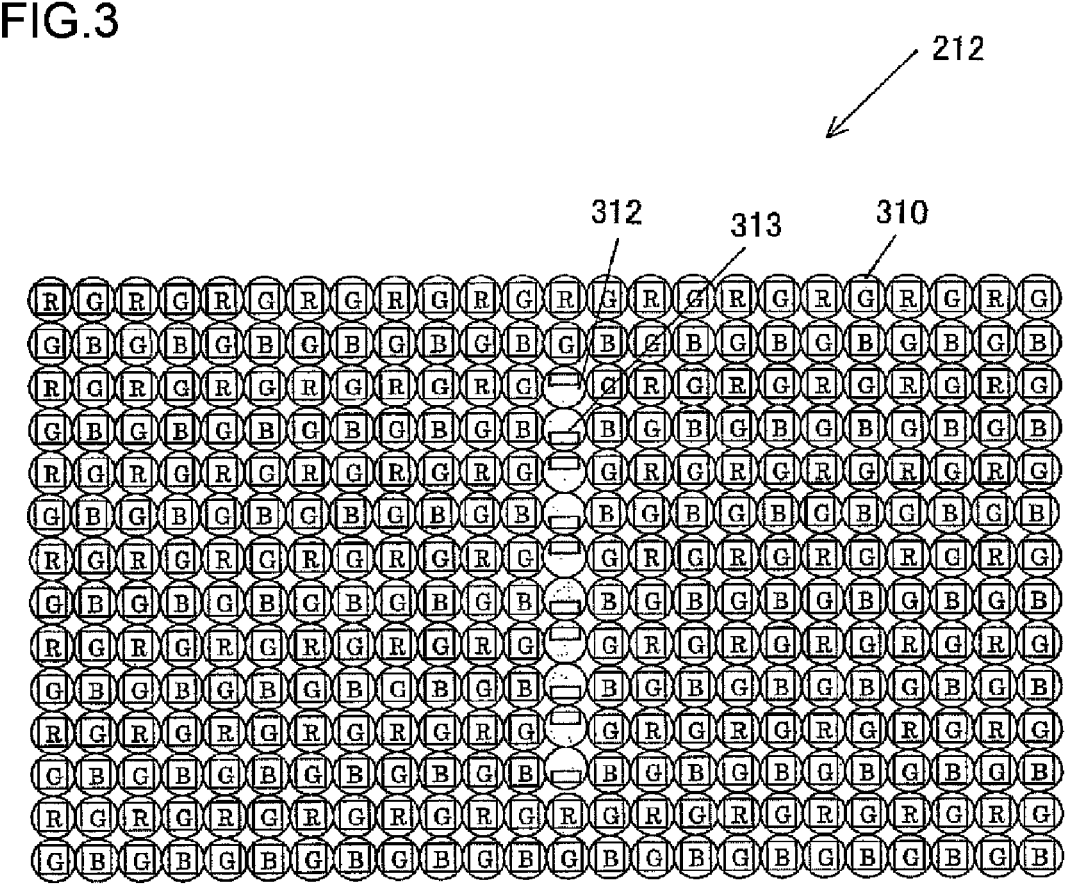
FIG. 3 is a front view showing a detailed construction of an image pickup device.

FIG. 3 is a front view showing a detailed construction of the image pickup device 212, the view illustrating the vicinity of the focus detection area on the image pickup device 212 in an enlarged scale. The vertical and horizontal directions of the image pickup device 212 (rows and columns of pixels) correspond respectively to the vertical and horizontal directions of the shooting screen shown in FIG. 2. The image pickup device 212 is made up of image pickup pixels 310 and focus detection pixels 312 and 313. In the focus detection area 101 shown in FIG. 2, the focus detection pixels 312 and 313 are alternately arrayed in the vertical direction. More specifically, the focus detection pixels 312 and 313 are arranged to lie on a linear line at pixel positions where R and G of the image pickup pixels 310 are to be arrayed.

Figure 4:
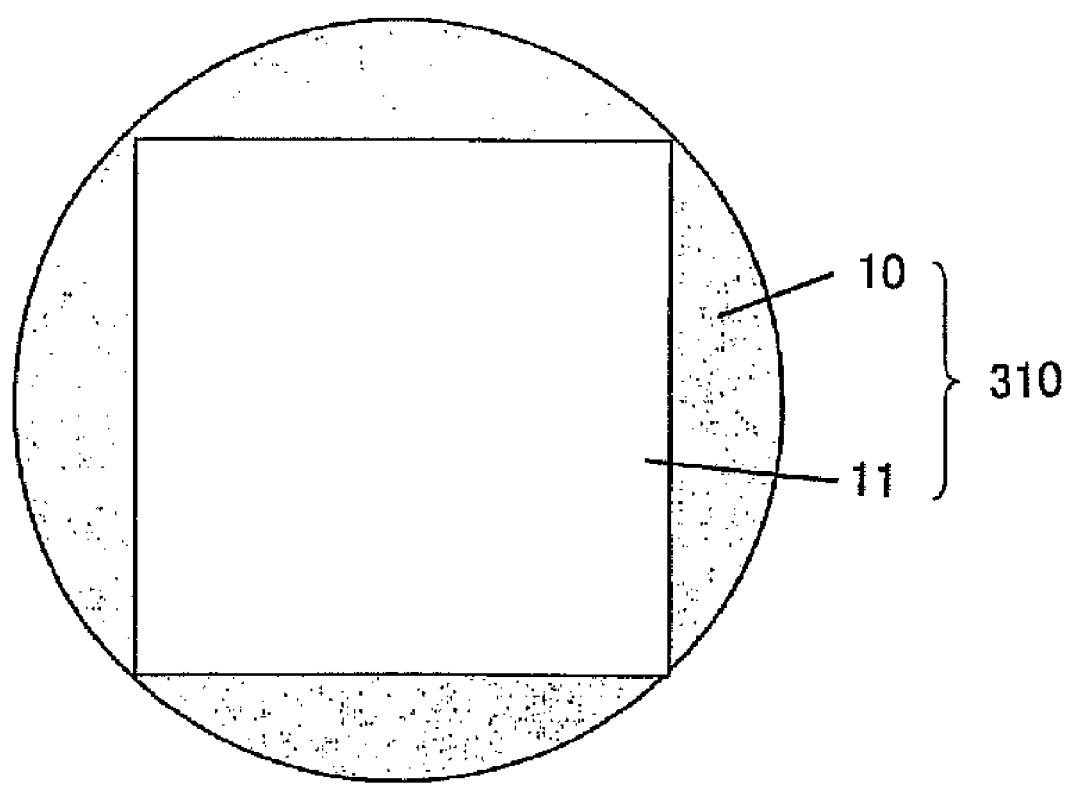
FIG. 4 is a front view of an image pickup pixel.
Figure 6:
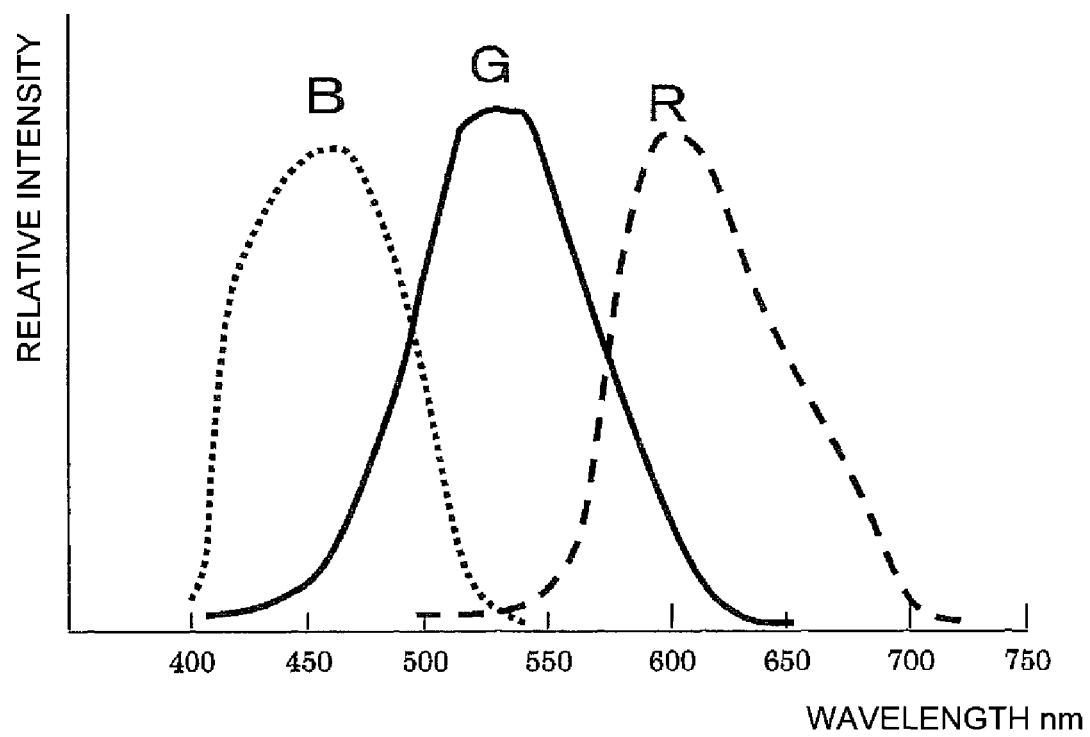
FIG. 6 is a graph showing spectroscopic sensitivity characteristics of the image pickup pixels.

FIG. 4 is a front view of each image pickup pixel 310. The image pickup pixel 310 is constituted by a microlens 10, a photoelectric conversion unit 11, and a color filter (not shown). There are three kinds of color filters in red (R), green (G) and blue (B), each of which has spectroscopic sensitivity shown in FIG. 6. The image pickup pixels 310 including the R, G and B filters are arranged in the Bayer array, as shown in FIG. 3.

Figure 5B:
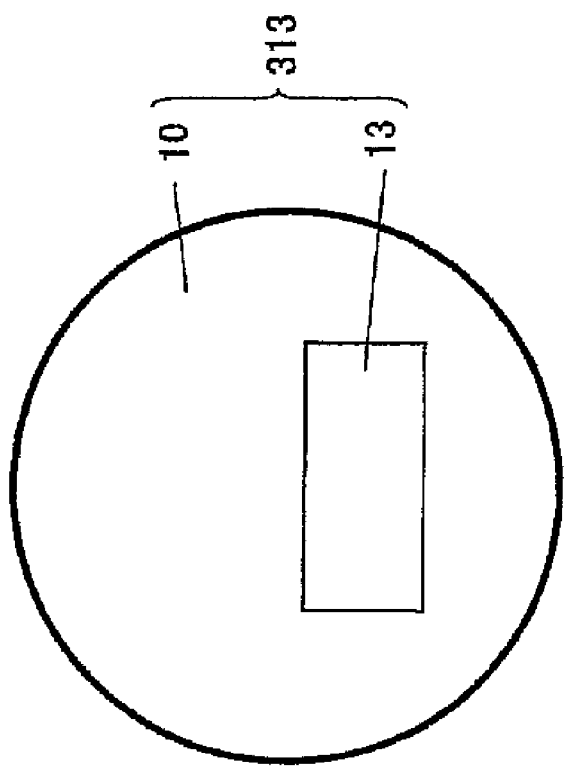
FIGS. 5A and 5B are front views of a focus detection pixel.
Figure 5A:
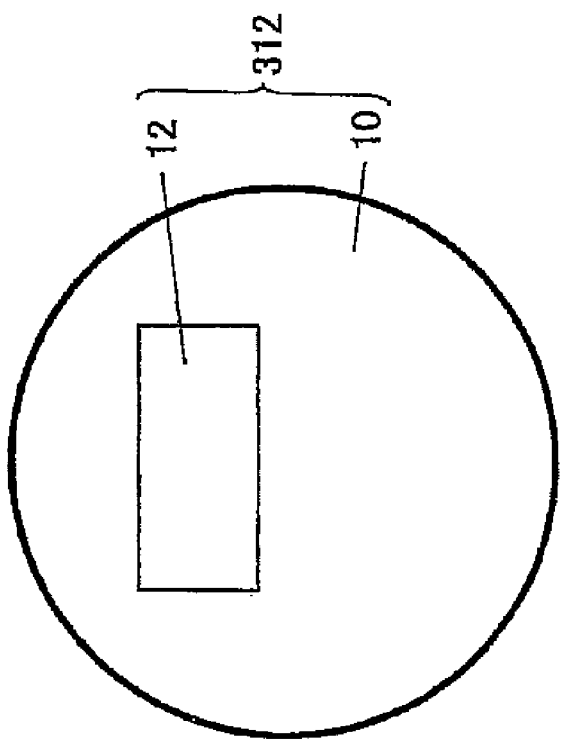

FIG. 5 is a front view of each focus detection pixel 312, 313. As shown in FIG. 5(a), the focus detection pixel 312 is constituted by a microlens 10 and a photoelectric conversion unit 12. The photoelectric conversion unit 12 has a rectangular shape of which lower side is positioned closely adjacent to a horizontal bisector of the microlens 10. On the other hand, as shown in FIG. 5(b), the focus detection pixel 313 is constituted by a microlens 10 and a photoelectric conversion unit 13. The photoelectric conversion unit 13 has a rectangular shape of which upper side is positioned closely adjacent to a horizontal bisector of the microlens 10.

The photoelectric conversion units 12 and 13 are arranged respectively at the upper and lower sides in the vertical direction so as to extend parallel to each other when the respective microlenses 10 are depicted in a superimposed relation, such that they have symmetrical shapes with respect to the horizontal bisector of each microlens 10. In the image pickup device 212, the focus detection pixel 312 and the focus detection pixel 313 are alternately arranged in the vertical direction (i.e., in the direction in which the photoelectric conversion units 12 and 13 are arranged side by side).

Figure 7:
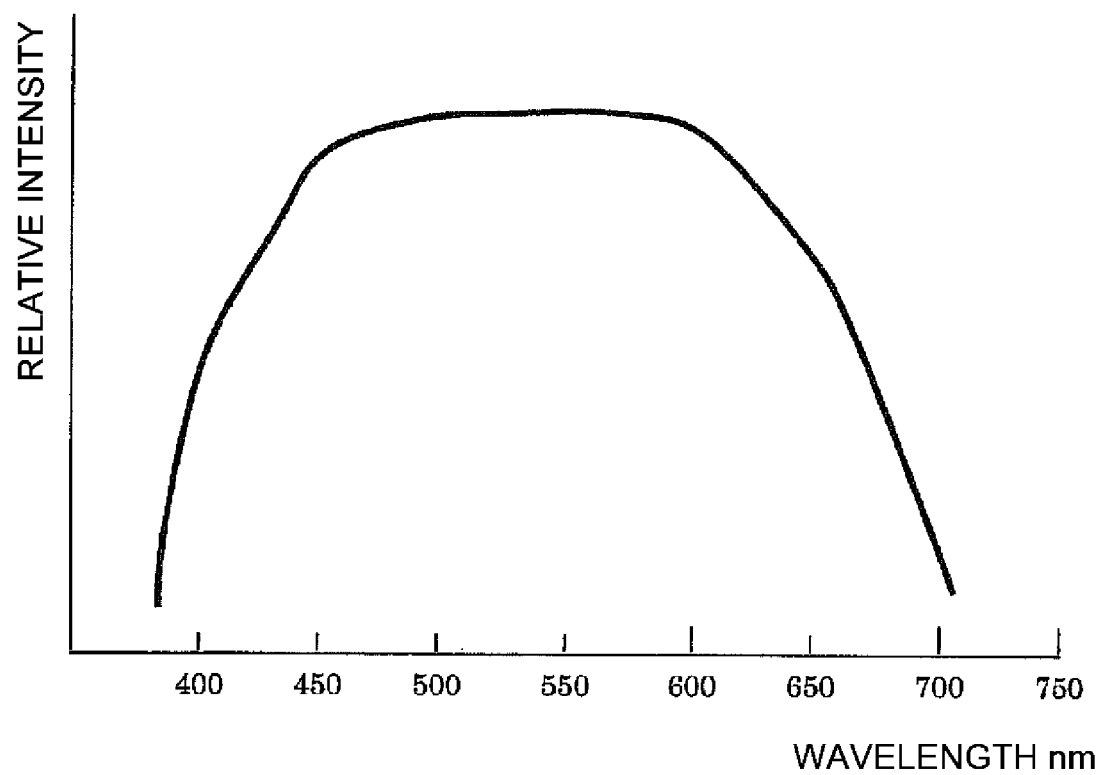
FIG. 7 is a graph showing a spectroscopic sensitivity characteristic of the focus detection pixel.

Color filters are not disposed in the focus detection pixels 312 and 313 in order to maximize the amount of light. Each of the focus detection pixels 312 and 313 has a spectroscopic characteristic, shown in FIG. 7, that is a combination of spectroscopic sensitivity of a photodiode performing the photoelectric conversion and a spectroscopic characteristic of an infrared cutoff filter (not shown). Thus, the focus detection pixel has a spectroscopic characteristic resulting from adding the spectroscopic characteristics of the green pixel, the red pixel, and the blue pixel (see FIG. 6). A light wavelength range of sensitivity of the focus detection pixel involves that of sensitivity covered by the green pixel, the red pixel, and the blue pixel.

The photoelectric conversion unit 11 of the image pickup pixels 310 is designed in such a shape that the whole of the light beam passing through an exit pupil (corresponding to, for example, F1.0) of the interchangeable lens 202 (see FIG. 1) having s the minimum F-number is received through the microlens 10. On the other hand, the photoelectric conversion units 12 and 13 of the focus detection pixels 312 and 313 are each designed in such a shape that the whole of the light beam passing through a predetermined region (corresponding to, for example, F2.8) of the exit pupil of the interchangeable lens 202 is received through the microlens 10.

Figure 8:
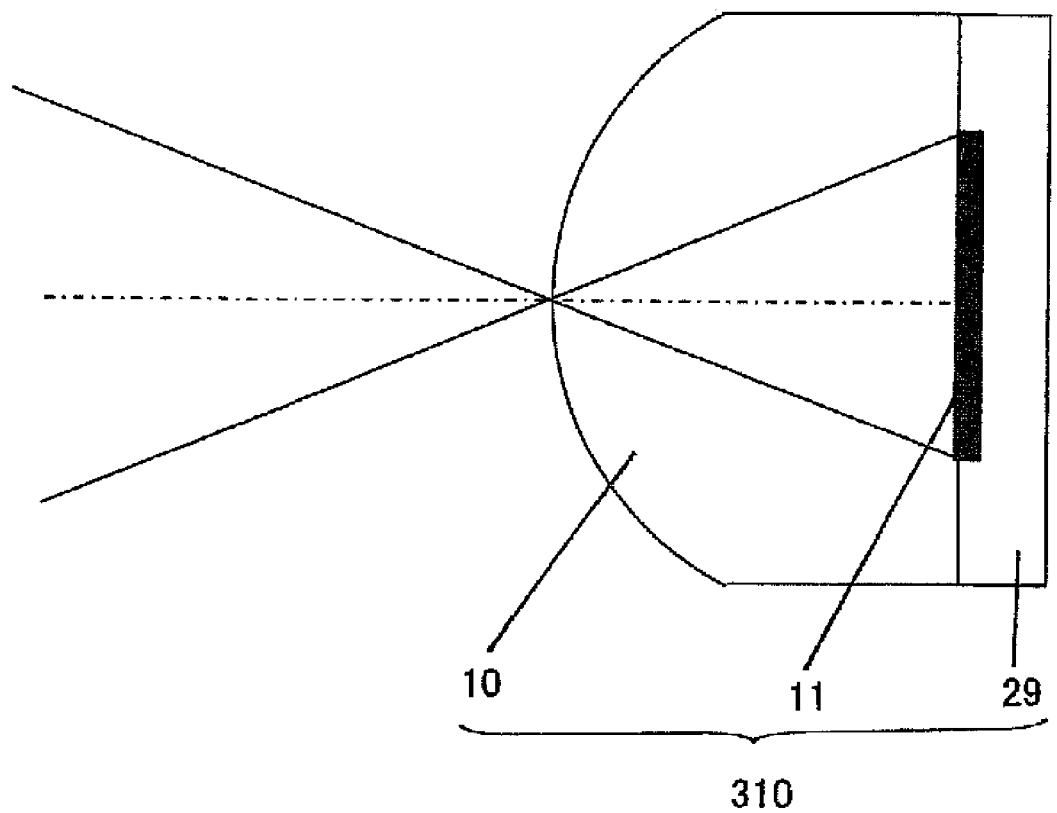
FIG. 8 is a sectional view of the image pickup pixel.

FIG. 8 is a sectional view of the image pickup pixel 310. In the image pickup pixel 310, the microlens 10 is arranged in front of the image-pickup photoelectric conversion unit 11 such that the photoelectric conversion unit 11 is projected forward by the microlens 10. The photoelectric conversion unit 11 is formed on a semiconductor circuit substrate 29, and the color filter (not shown) is arranged intermediate between the microlens 10 and the photoelectric conversion unit 11.

Figure 9A:
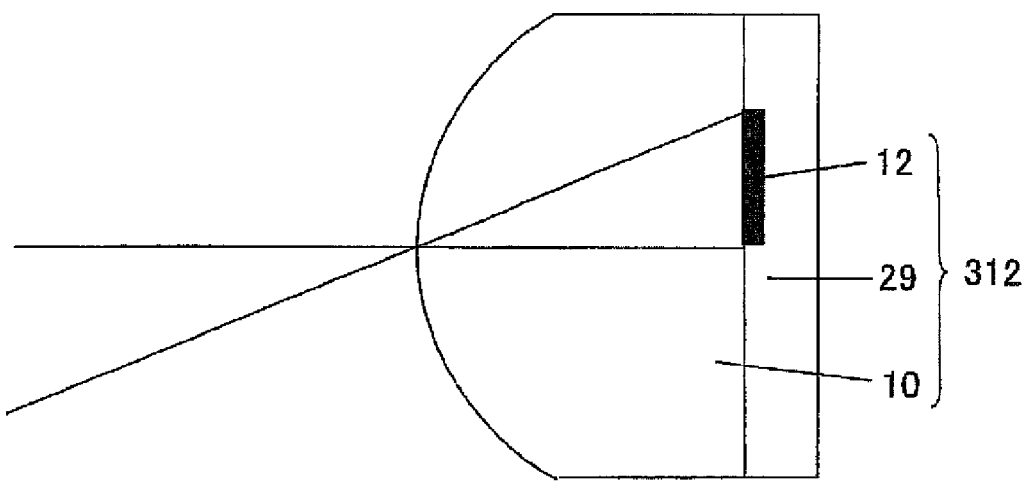
FIGS. 9A and 9B are sectional views of the focus detection pixel.

FIG. 9(a) is a sectional view of the focus detection pixel 312. In the focus detection pixel 312, the microlens 10 is arranged in front of the image-pickup photoelectric conversion unit 12 such that the photoelectric conversion unit 12 is projected forward by the microlens 10. The photoelectric conversion unit 12 is formed on the semiconductor circuit substrate 29, and the microlens 10 is integrally and fixedly formed thereon by the process of manufacturing the semiconductor image sensor. The photoelectric conversion unit 12 is arranged in one side of an optical axis of the microlens 10.

Figure 9B:
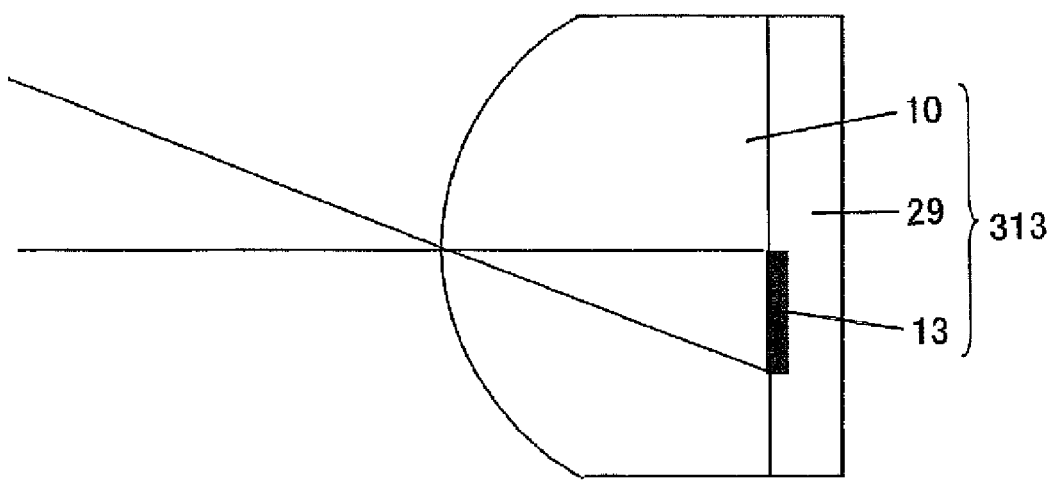

FIG. 9(b) is a sectional view of the focus detection pixel 313. In the focus detection pixel 313, the microlens 10 is arranged in front of the image-pickup photoelectric conversion unit 13 such that the photoelectric conversion unit 13 is projected forward by the microlens 10. The photoelectric conversion unit 13 is formed on the semiconductor circuit substrate 29, and the microlens 10 is integrally and fixedly formed thereon by the process of manufacturing the semiconductor image sensor. The photoelectric conversion unit 13 is arranged in the other side of an optical axis of the microlens 10 opposite to the photoelectric conversion unit 12.

Figure 10:
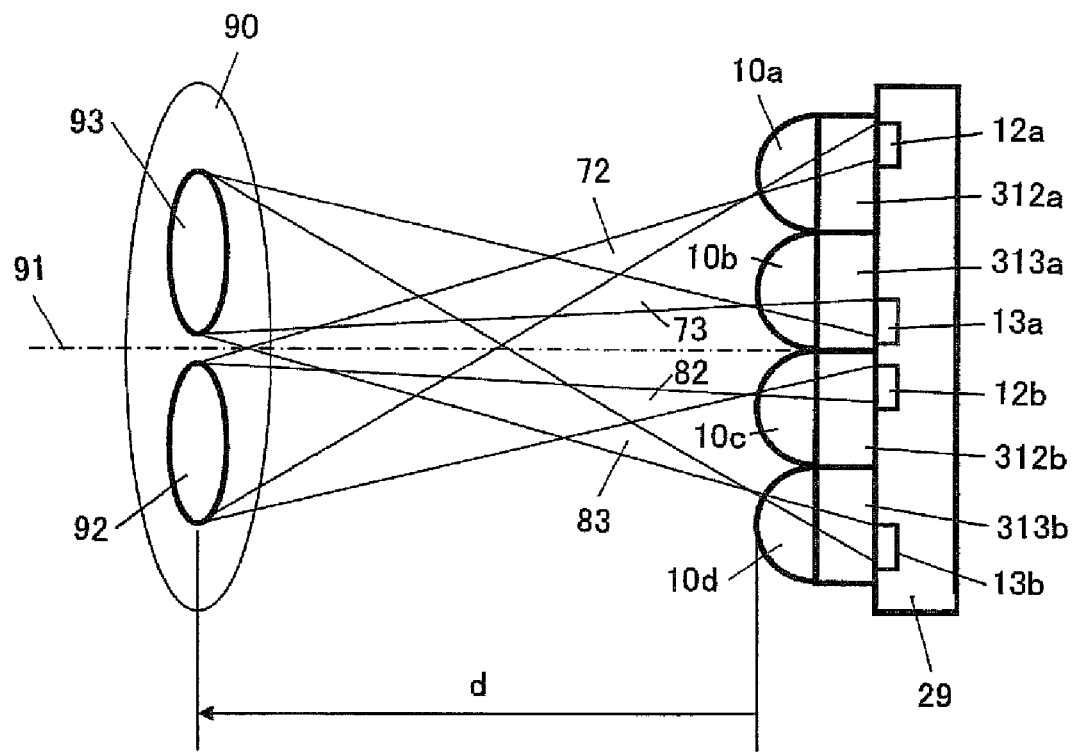
FIG. 10 illustrates a construction of a focus detection optical system based on a pupil-split phase difference detection method using microlenses.

FIG. 10 illustrates a construction of a focus detection optical system based on the pupil-split phase difference detection method using microlenses. In FIG. 10, reference character 90 denotes an exit pupil which is arranged in an estimated imaging plane of the interchangeable lens 202 (see FIG. 1) and which is set at a distance d in front of the microlenses. The distance d is a value decided depending on the curvature and the refractive index of each microlens, the distance between the microlens and the photoelectric conversion unit, etc. In this specification, the distance d is called a ranging pupil distance.

Reference character 91 denotes an optical axis of the interchangeable lens 202, and 10a-10d denote microlenses. Reference characters 12a, 12b, 13a and 13b denote photoelectric conversion units, 312a, 312b, 313a and 313b denote focus detection pixels, and 72, 73, 82 and 83 denote focus detection light beams. Reference character 92 denotes a region of each of the photoelectric conversion units 12a and 12b projected respectively by the microlens 10a and 10c. That region is called a ranging pupil in this specification. Also, reference character 93 denotes a region of each of the photoelectric conversion units 13a and 13b projected respectively by the microlens 10b and 10d. That region is also called a ranging pupil in this specification. For the sake of easier recognition, the regions 92 and 93 are each illustrated in an elliptic shape in FIG. 10. In fact, however, each region 92, 93 has the same shape as that resulting from projecting the photoelectric conversion unit in an enlarged scale.

While FIG. 10 schematically illustrates four focus detection pixels 312a, 312b, 313a and 313b adjacent to each other, the photoelectric conversion units in the other focus detection pixels similarly detect the focus detection light beams entering the respective microlens from the corresponding ranging pupils. The direction in which the focus detection pixels are arrayed is matched with the direction in which a pair of ranging pupils are arranged side by side, i.e., with the direction in which a pair of photoelectric conversion units are arranged side by side.

The microlenses 10a-10d are arranged near the estimated imaging plane of the interchangeable lens 202 (see FIG. 1). The shapes of the photoelectric conversion units 12a, 12b, 13a and 13b arranged behind the microlenses 10a-10d, respectively, are projected onto the exit pupil 90 spaced from the microlenses 10a-10d by the ranging pupil distance d, and the projected shapes form the ranging pupils 92 and 93. In other words, respective projecting directions of the photoelectric conversion units in the pixels are decided such that the projected shapes (i.e., the ranging pupils 92 and 93) of the photoelectric conversion units in the pixels are matched with each other on the exit pupil 90 positioned at the projecting distance d.

The photoelectric conversion unit 12a outputs a signal corresponding to the intensity of an image formed on the microlens 10a by the light beam 72 that enters the microlens 10a after passing through the ranging pupil 92. The photoelectric conversion unit 12b outputs a signal corresponding to the intensity of an image formed on the microlens 10c by the light beam 82 that enters the microlens 10c after passing through the ranging pupil 92. The photoelectric conversion unit 13a outputs a signal corresponding to the intensity of an image formed on the microlens 10b by the light beam 73 that enters the microlens 10b after passing through the ranging pupil 93. The photoelectric conversion unit 13b outputs a signal corresponding to the intensity of an image formed on the microlens 10d by the light beam 83 that enters the microlens 10d after passing through the ranging pupil 92.

Thus, by arranging the above-described two types of many focus detection pixels on a linear line and collecting outputs of the photoelectric conversion units in those pixels into two output groups which correspond respectively to the ranging pupils 92 and 93, it is possible to obtain information regarding an intensity distribution of a pair of images which are formed on the pixel line by the focus detection light beams passing respectively through the ranging pupils 92 and 93. An image shift amount between the pair of images can be detected based on the so-called pupil-split phase difference detection method by executing a later-described image shift detection processing (correlation processing or phase difference detection process) on the obtained information.

Further, by executing a conversion computation for the image shift amount depending on the centroidal interval between the pair of ranging pupils, a deviation (defocus amount) of a current imaging plane (i.e., an imaging plane at the focus detection position corresponding to the position of the microlens on the estimated imaging plane) relative to the estimated imaging plane is calculated. While the above description is made on an assumption of a state that the ranging pupil is not restricted by the diaphragm aperture, the ranging pupil has in fact a shape and a size restricted by the diaphragm aperture.

FIG. 11 is an illustration for explaining the relationship between the defocus amount and the image shift amount in the pupil-split phase difference detection method. As shown in FIG. 11(a), the light beam forming an image after divisionally passing through the ranging pupils 92 and 93 in the exit pupil plane 90 of the optical system is divided into the light beam 72 having passed through the ranging pupil 92 and the light beam 73 having passed through the ranging pupil 93. With such an arrangement, for example, when a line pattern (white line on a black background) positioned on the optical axis 91 and extending perpendicularly to the drawing sheet of FIG. 11 is imaged by the optical system, the light beam 72 having passed through the ranging pupil 92 and the light beam 73 having passed through the ranging pupil 93 form, on an in-focus plane P0, high-contrast line image patterns at the same position on the optical axis 91, as shown in FIG. 11(c).

Figure 11A:
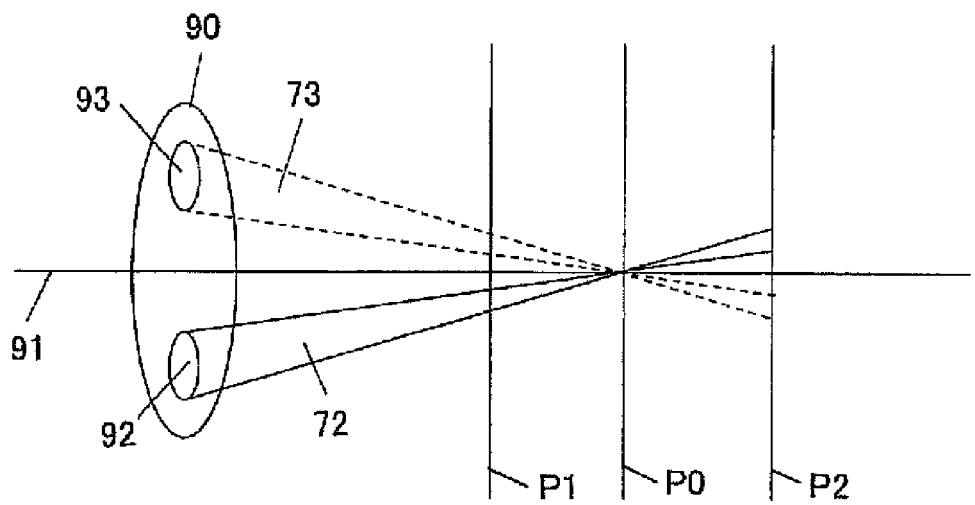
FIG. 11A-11D are illustrations for explaining the relationship between a defocus amount and an image shift amount in the pupil-split phase difference detection method.
Figure 11B:
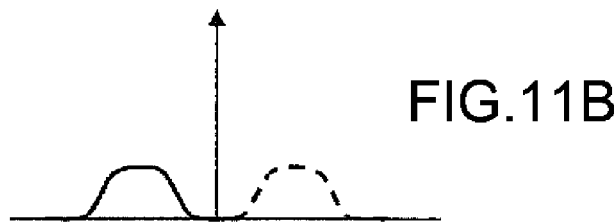
Figure 11C:
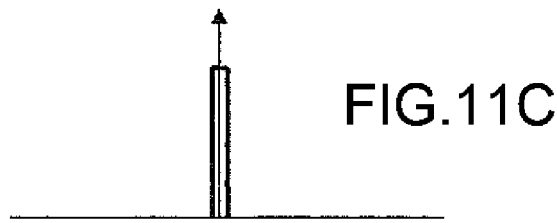
Figure 11D:
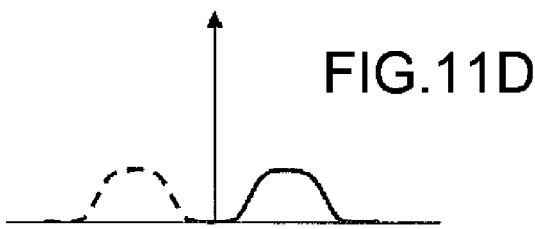

On a plane P1 forward of the in-focus plane P0, however, the light beam 72 having passed through the ranging pupil 92 and the light beam 73 having passed through the ranging pupil 93 form, as shown in FIG. 11(b), blurred line image patterns at different positions. Also, on a plane P2 rearward of the in-focus plane P0, the light beam 72 having passed through the ranging pupil 92 and the light beam 73 having passed through the ranging pupil 93 form, as shown in FIG. 11(d), blurred line image patterns at different positions on the side opposed to the blurred line image patterns in FIG. 11(b). Accordingly, by separating and detecting two images formed by the light beam 72 having passed through the ranging pupil 92 and the light beam 73 having passed through the ranging pupil 93 and calculating the relative positional relationship of those two images (i.e., the image shift amount), it is possible to detect the focus adjusted state (defocus amount) of the optical system in the plane where those two images have been detected.

Figure 12:
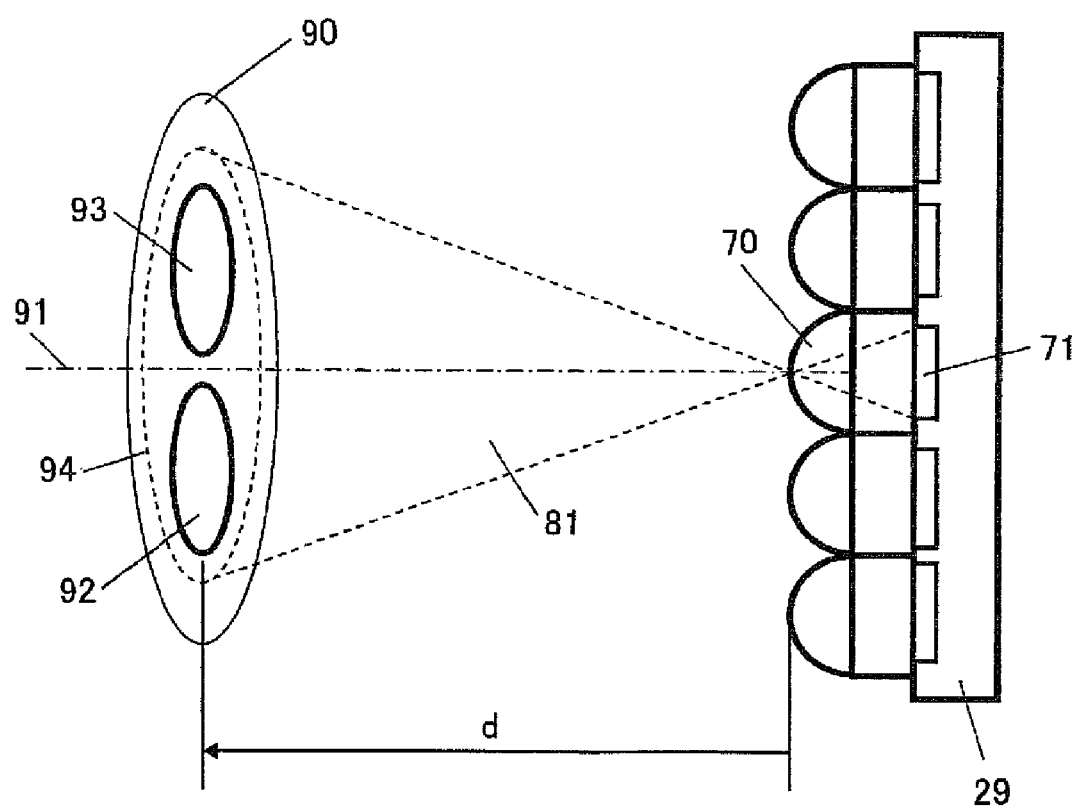
FIG. 12 is an illustration for explaining the relationship between the image pickup pixel and an exit pupil.

FIG. 12 is an illustration for explaining the relationship between the image pickup pixel and the exit pupil. Note that similar elements to those in FIG. 10 are denoted by the same reference characters and a description of those elements is omitted here. Reference character 70 denotes a microlens, 71 denotes a photoelectric conversion unit of the image pickup pixel, 81 denotes an image pickup light beam, and 94 denotes a region of the photoelectric conversion unit 71 projected by the microlens 70. While FIG. 12 schematically illustrates the image pickup pixel (made up of the microlens 70 and the photoelectric conversion unit 71) positioned on the optical axis 91, the photoelectric conversion units of the other image pickup pixels also receive the light beams coming from corresponding regions 94 through respective microlenses.

The microlens 70 is arranged near the estimated imaging plane of the optical system, and the microlens 70 arranged on the optical axis 91 projects the shape of the photoelectric conversion unit 71, which is arranged behind the microlens 70, onto the exit pupil 90 which is spaced from the microlens 70 by a distance d. The projected shape defines the region 94. The photoelectric conversion unit 71 outputs a signal corresponding to the intensity of an image formed on the microlens 70 by the image pickup light beam 81 that enters the microlens 70 after passing through the region 94. By arranging a large number of image pickup pixels in a two-dimensional pattern in such a manner, image information can be obtained based on the photoelectric conversion units of the respective pixels. While the above description is made on an assumption of a state that the region 94 is not restricted by the diaphragm aperture, the region 94 has in fact a shape and a size restricted by the diaphragm aperture.

Figure 13:
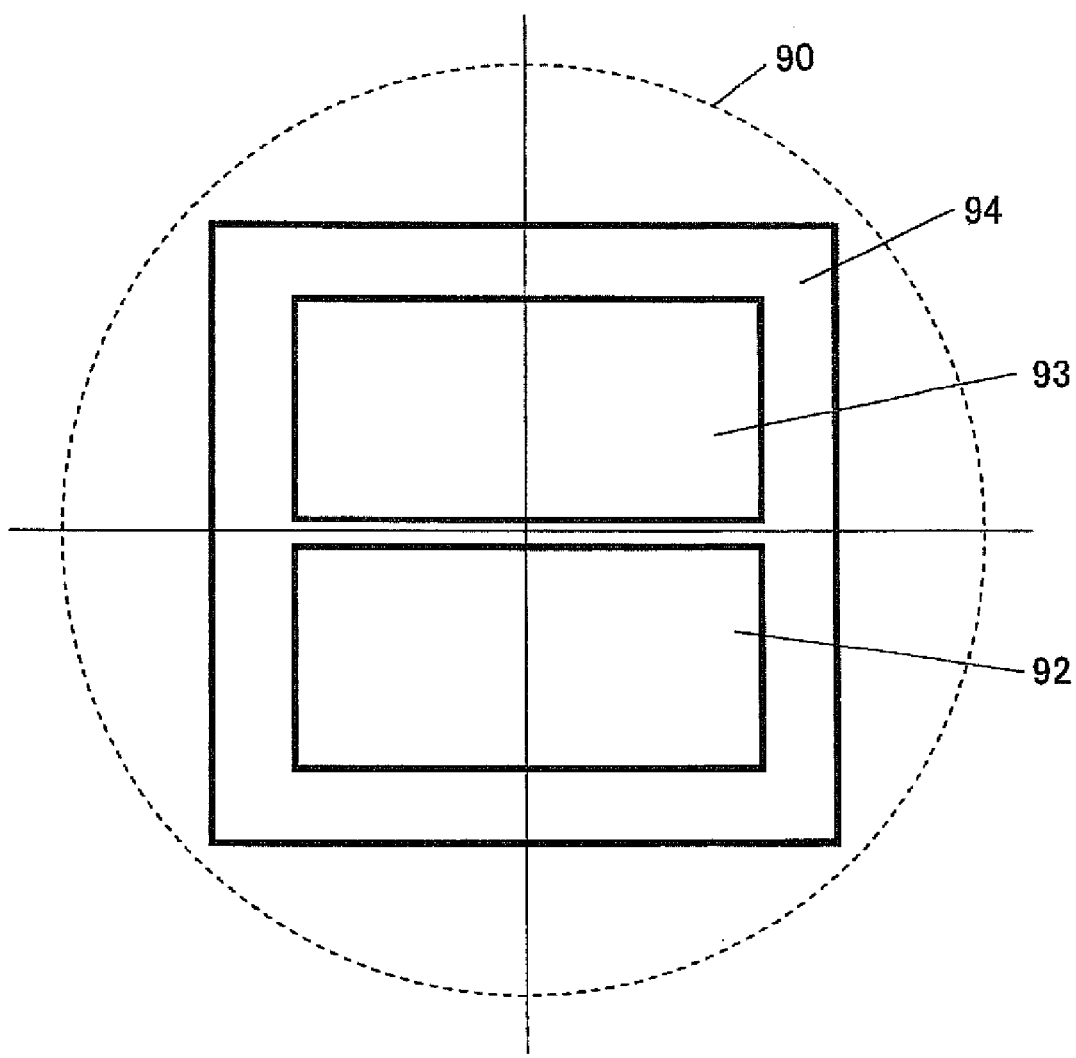
FIG. 13 is a front view showing the projection positional relationship on an exit pupil plane.

FIG. 13 is a front view showing the projection positional relationship on the exit pupil plane. The ranging pupils 92 and 93 obtained by projecting, from the focus detection pixels, their photoelectric conversion units onto the exit pupil plane 90 through the microlenses are involved within the region 94 obtained by projecting, from the image pickup pixel, its photoelectric conversion units onto the exit pupil plane 90 through the microlens. The light beams actually received by the photoelectric conversion units of the focus detection pixels and the image pickup pixel are provided by light beams passing respective regions that are resulted from narrowing the region 94 and the ranging pupils 92 and 93 by the diaphragm aperture of the interchangeable lens 202 (see FIG. 1).

Figure 14:
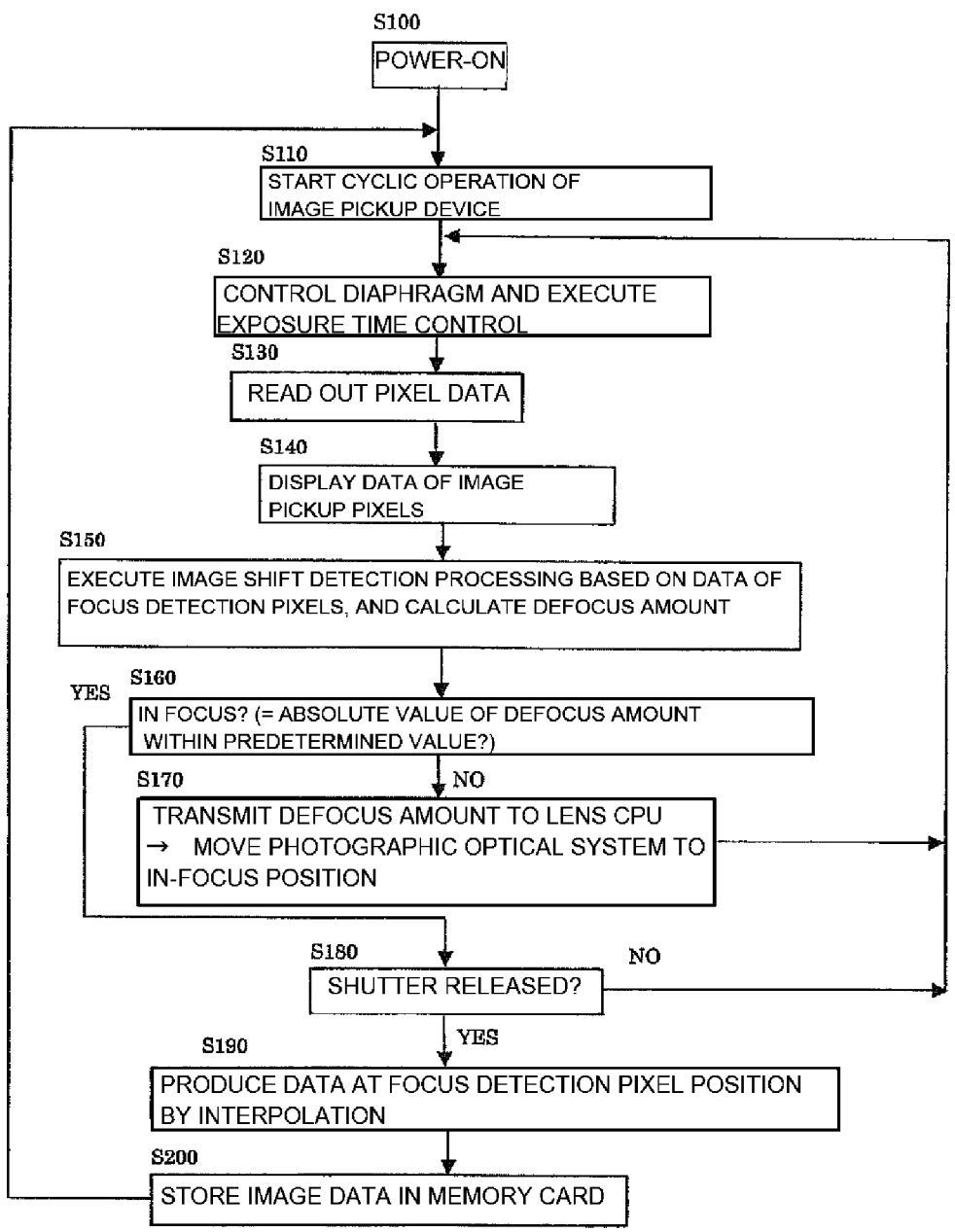
FIG. 14 is a flowchart showing the image pickup operation of the digital still camera (image pickup apparatus) shown in FIG. 1.

FIG. 14 is a flowchart showing the image pickup operation of the digital still camera (image pickup apparatus) shown in FIG. 1. When a power supply of the camera 201 is turned on in step 100, the body drive controller 214 starts the image pickup operation. In step 110, the body drive controller 214 instructs an image-pickup device drive control circuit (though not shown, it is incorporated in the body drive controller 214) to start the cyclic operation of the image pickup devices 212. In step 120, the body drive controller 214 sends, to the lens drive controller 206, diaphragm control information corresponding to either a shooting aperture value that is automatically decided depending on the object brightness measured by a photometric sensor (not shown), or a shooting aperture value that is manually set by the photographer using an operating member (not shown). Further, the body drive controller 214 executes exposure time control of the image pickup devices 212 so that image data is provided as data having an appropriate level.

In step 130, the body drive controller 214 reads out pixel data from the image pickup devices 212, and in next step 140, it displays the data of the image pickup pixels on an electronic viewfinder. In step 150, the body drive controller 214 executes the later-described image shift detection processing (correlation processing) based on a pair of image data corresponding to the focus detection pixel line, thereby determining the image shift amount to calculate the defocus amount. In step 160, it is determined whether an absolute value of the defocus amount is within a predetermined value, i.e., whether the optical system is in focus or not. If the determination indicates the state not in focus, the body drive controller 214 proceeds to step 170 in which it transmits the defocus amount to the lens drive controller 206 and drives the focusing lens 210 of the interchangeable lens 202 to an in-focus position. Thereafter, the body drive controller 214 returns to step 120 and repeats the above-described operation. Additionally, when the focus cannot be detected, the flow is also branched to step 170 in which the body drive controller 214 transmits a scan drive command to the lens drive controller 206 and drives the focusing lens 210 of the interchangeable lens 202 to be scanned between the infinitive and the proximate. Thereafter, the body drive controller 214 returns to step 120 and repeats the above-described operation.

On the other hand, if the determination indicates the in-focus state, the body drive controller 214 proceeds to step 180 in which it determines whether a shutter is released by operation of a release button (not shown). If the determination indicates that the shutter is not released, the body drive controller 214 returns to step 120 and repeats the above-described operation. If the determination indicates that the shutter is released, the body drive controller 214 proceeds to step 190 in which it produces pixel data of each pixel position in the focus detection pixel line through interpolation based on the data of the relevant focus detection pixel and the data of the ambient image pickup pixels. After storing, in next step 200, image data made up of the data of the image pickup pixels and the interpolated data in the memory card 219, the body drive controller 214 returns to step 110 and repeats the above-described operation.

FIG. 15 is a plot for explaining details of the image shift detection processing (correlation processing) executed in step 150 of FIG. 14. A high-frequency cutoff filtering process, represented by the following formulae (1), is executed on a pair of data strings ($\alpha 1$ to $\alpha M$ and $\beta 1$ to $\beta M$: M is the number of data) which are output from the focus detection pixel line, to generate a first data string A1-AN and a second data string B1-BN, thereby removing, from the data strings, noise components and high-frequency components that adversely affect the correlation processing. The filtering process can be omitted when a computation time should be shortened or when it is already known that the high-frequency components are small due to a large defocus.

$$An = \alpha n + 2 \times \alpha n + 1 + \alpha n + 2$$

$$Bn = \beta n + 2 \times \beta n + 1 + \beta n + 2 \tag{1}$$

In the formulae (1), n=1 to N.

A correlation factor C(k) is computed from the data strings An and Bn by using a correlation computation formula (2) given below:

$$C(k) = \Sigma |An \times Bn+1+k - Bn+k \times An+1| \tag{2}$$

Figure 15A:
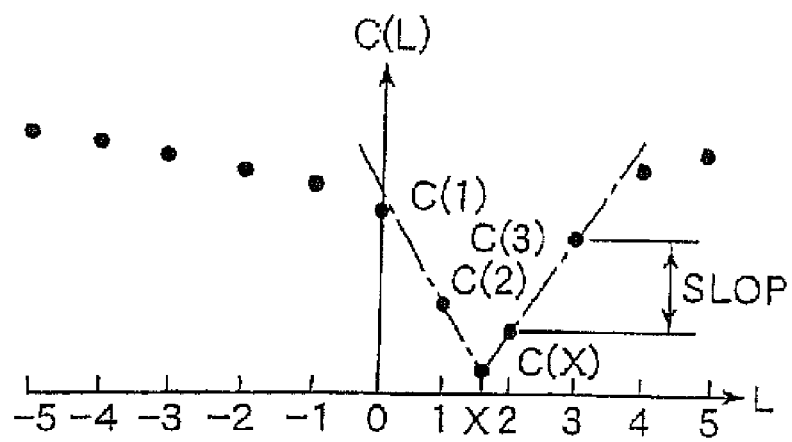
FIGS. 15A-15C are plots for explaining details of an image shift detection processing (correlation processing) executed in step 150 in FIG. 14.

In the formula (2), $\Sigma$ represents cumulative summation with respect to n, and a range covered by n is limited, depending on a shift amount k, to the range where data of An, An+1, Bn+k and Bn+1+k is present. The shift amount k is an integer and represents a relative shift amount in units of data interval between the data lines. The computation result of the formula (2) is obtained, as shown in FIG. 15(a), such that the correlation factor C(k) is minimized at the shift amount (k=kj=2 in FIG. 15(a)) which provides maximum correlation between the pair of data (a smaller correlation factor shows a higher correlation degree).

Next, a shift amount x providing a minimum value C(x) in the continuously varying correlation factor is determined by using a three-point interpolation method represented by the following formulae (3) to (6):

$$x = kj + D/SLOP \tag{3}$$

$$C(x) = C(kj) - |D| \tag{4}$$

$$D = \{C(kj-1) - C(kj+1)\}/2 \tag{5}$$

$$SLOP = MAX\{C(kj+1) - C(kj), C(kj-1) - C(kj)\} \tag{6}$$

Figure 15B:
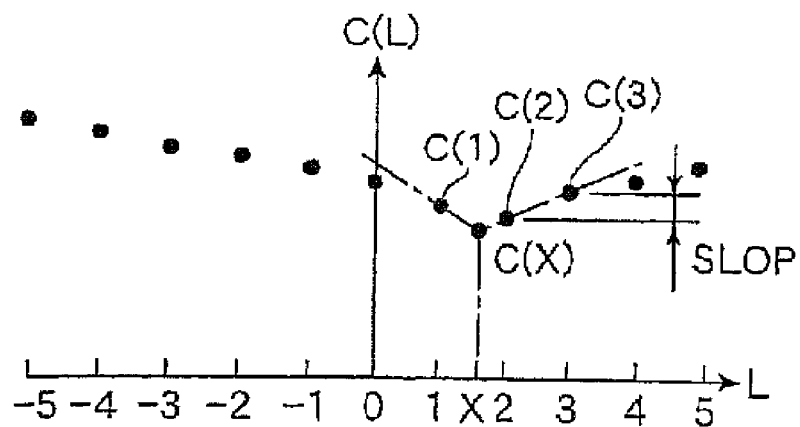
Figure 15C:
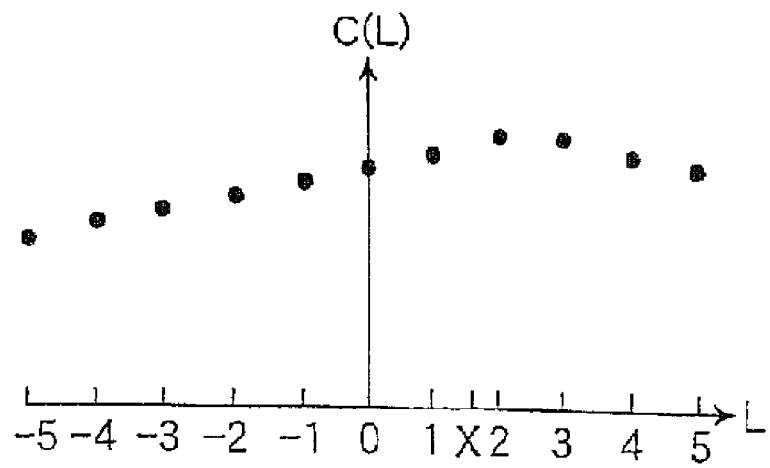

Whether the shift amount x calculated from the formula (3) has reliability is determined as follows. As shown in FIG. 15(b), when the correlation degree between the pair of data is low, the minimum value C(x) of the correlation factor obtained by the interpolation becomes large. Accordingly, if C(x) is equal to or larger than a predetermined threshold, the calculated shift amount x is canceled based on the determination that reliability of the calculated shift amount is low. As an alternative, from the viewpoint of normalizing C(x) in terms of data contrast, if a value resulting from dividing C(x) by SLOP, which takes a value in prounit to the contrast, is equal to or larger than a predetermined threshold, the calculated shift amount x is canceled based on the determination that reliability of the calculated shift amount is low. Alternatively, if SLOP taking a value in prounit to the contrast is equal to or smaller than a predetermined threshold, the calculated shift amount x is canceled based on the determination that the object has low contrast and reliability of the calculated shift amount is low. Further, when the correlation between the pair of data is low and the correlation factor C(k) shows no fall in the shift range kmin-kmax as shown in FIG. 15(c), the minimum value C(x) cannot be determined. In such a case, therefore, it is determined that the focus detection is unable to perform.

If the calculated shift amount x is determined to be reliable, a defocus amount DEF of the object image plane relative to the estimated imaging plane can be expressed by the following formula (7):

$$DEF = KX \cdot PY \cdot x \tag{7}$$

In the formula (7), PY is a detection pitch (pitch of the focus detection pixels) and KX is a conversion coefficient that is decided depending on the magnitude of an opening angle formed by the centroids of the light beams passing through the pair of ranging pupils. Because the magnitude of the opening angle formed by the centroids of the light beams passing through the pair of ranging pupils is changed depending on the aperture size (aperture value) of the diaphragm 211 of the interchangeable lens 202 (see FIG. 1), it is decided depending on the lens information.

Figure 16:
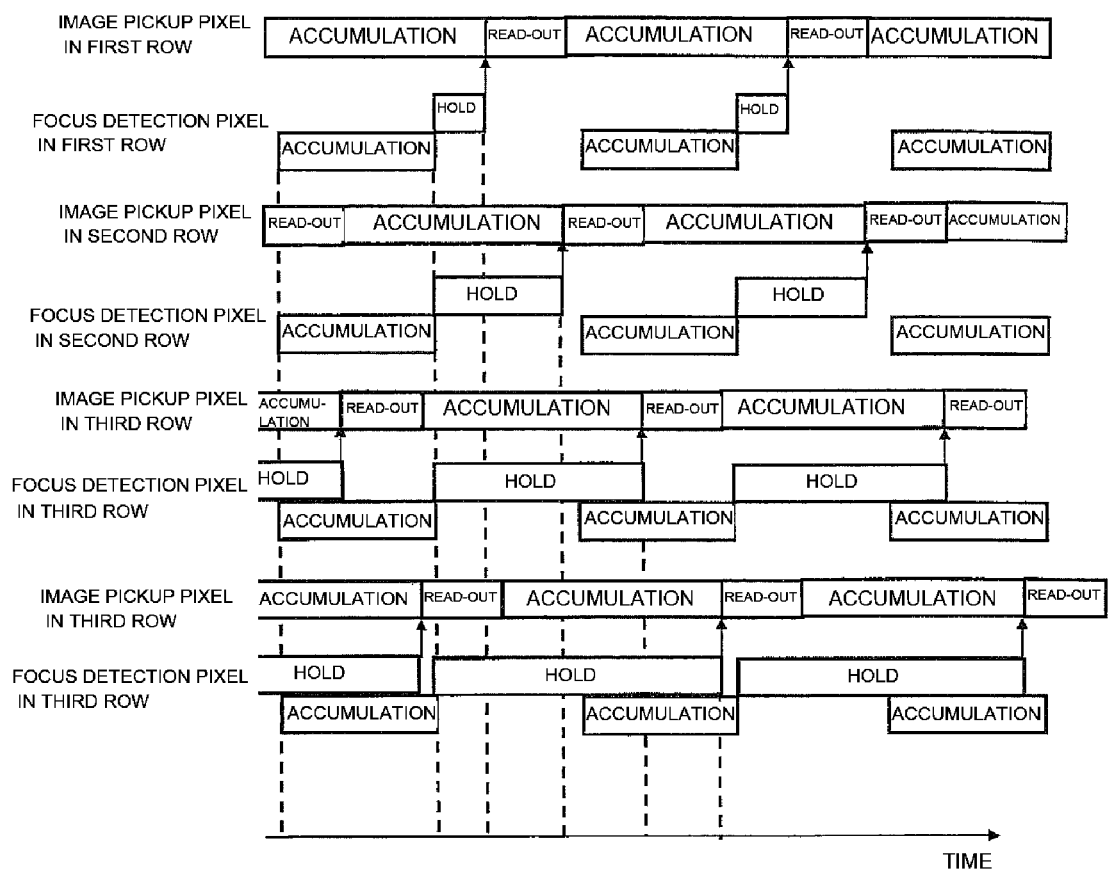
FIG. 16 is a timing chart showing the cyclic operation of the image pickup device.
Figure 17:
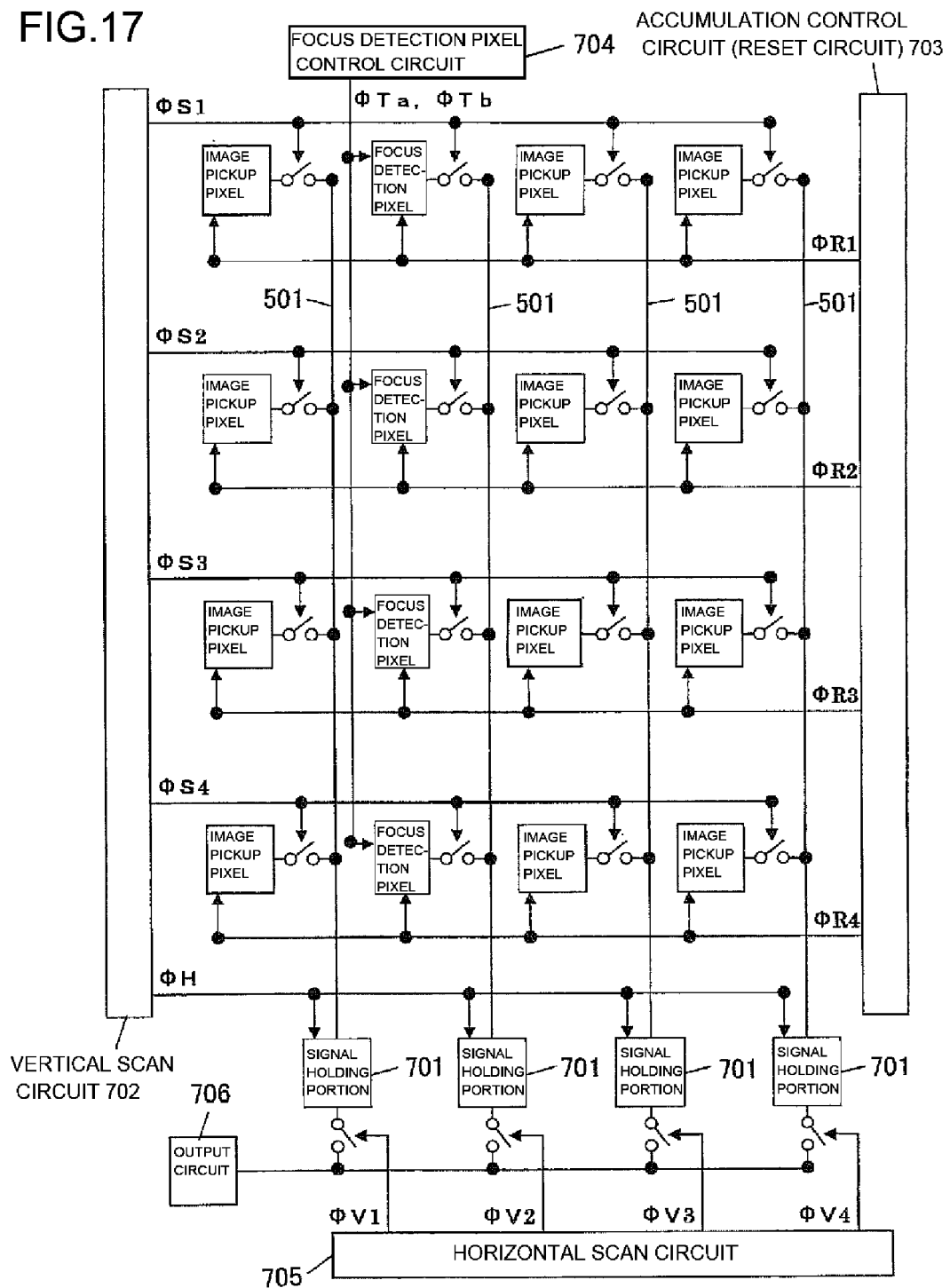
FIG. 17 is a circuit diagram showing a circuit configuration of the image pickup device.

The construction and the operation of the image pickup device 212 will be described in more detail below. FIG. 16 is a timing chart showing the cyclic operation of the image pickup device 212, and FIG. 17 is a circuit diagram showing the circuit configuration of the image pickup device 212. In FIGS. 16 and 17, for simplification of the description, the image pickup device 212 includes 4 pixels×4 pixels (4 rows×4 columns) and the focus detection pixel is arranged in the second column of each row. The image pickup device 212 according to the one embodiment is a CMOS image sensor, and the image signals are read out from the image pickup pixels in accordance with the rolling shutter method.

In each row, charge accumulation (exposure) and subsequent read-out from the photoelectric conversion unit of the image pickup pixel are alternately performed in a sequential manner. The read-out of the image signal from the image pickup pixel is performed in the order of the first row, the second row, the third row, and the fourth row, and such read-out operation is repeated at a predetermined cycle. The charge accumulation (exposure) of the photoelectric conversion unit of the focus detection pixel in each row is performed at the same time as the image pickup pixel, and charges accumulated in each focus detection pixel are held (in the memory) within the focus detection pixel during a period from the end of the charge accumulation to the start of read-out from each row.

By executing the above-described operation sequence, the charge accumulation timings of all the focus detection pixels can be made the same and can be made independently of the charge accumulation timings of the image pickup pixels while reading out the image signals from the image pickup pixels at the predetermined cycle in accordance with the rolling shutter method. As a result, the focus detection operation can be performed in an independent manner while keeping constant a refresh cycle of the EVF (electric viewfinder) and maintaining concurrence of the charge accumulation timings of the focus detection pixels. Additionally, when a charge accumulation time of the focus detection pixel is desired to be longer than the cycle of the image pickup pixel in the case of low brightness, such a demand can be adapted by setting a signal read-out time of the focus detection pixel to be integer times the cycle of the image pickup pixel.

In FIG. 17, as described above, the image pickup devices 212 are arrayed in layout of 4 pixels×4 pixels. The focus detection pixel is arranged in the second column of each row and the other pixels correspond to the image pickup pixels. A signal holding unit 701 serves as a buffer for temporarily holding the image signal from each of the pixels in one row and latches the image signal, which is output to a vertical signal line 501, in accordance with a control signal ΦH issued from a vertical scan circuit 702. The charge accumulations of the image pickup pixels are controlled independently of one another per row in accordance with control signals (ΦR1-ΦR4) issued from an accumulation control circuit 703. On the other hand, the charge accumulations of the focus detection pixels are controlled in accordance with control signals ΦTa and ΦTb issued from a focus detection pixel control circuit 704.

Outputs of the image signals from the image pickup pixels and the focus detection pixels are controlled independently of one another per row in accordance with control signals (ΦS1-ΦS4) issued from the vertical scan circuit 702. The image signals of the pixels in the row selected by the control signal are output to the respective vertical signal lines 501. The image signals held in the signal holding units 701 are successively transferred to an output circuit 706 in accordance with control signals (ΦV1-ΦV4) issued from a horizontal scan circuit 705 and are output externally of the image pickup device 212 after being amplified at a set amplification degree.

Figure 18:
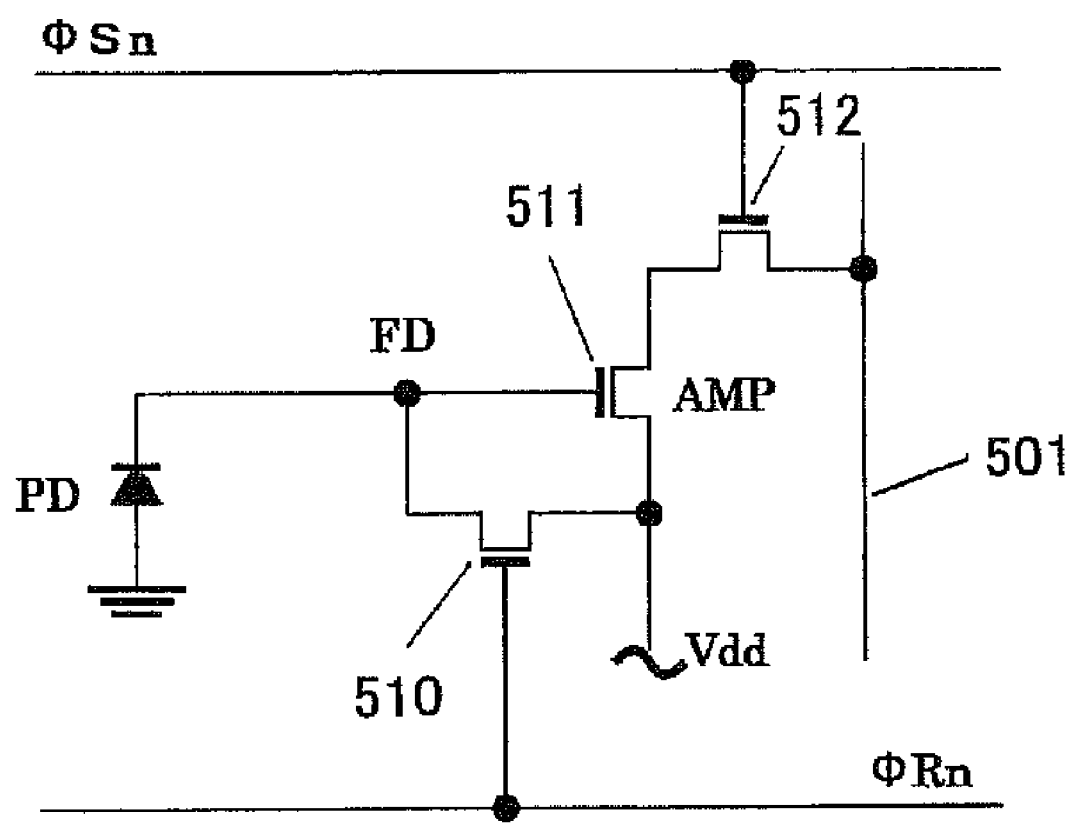
FIG. 18 illustrates a detailed circuit of the image pickup pixel shown in FIG. 17.

FIG. 18 illustrates a detailed circuit of the image pickup pixel shown in FIG. 17. The photoelectric conversion unit is constituted by a photodiode (PD). Charges accumulated in the PD are accumulated in a floating diffusion layer (FD). The FD is connected to a gate of an amplifying MOS transistor (AMP), and the AMP generates a signal corresponding to the amount of charges accumulated in the FD. The FD is also connected to a power source voltage Vdd through a reset MOS transistor 510. When the reset MOS transistor 510 is turned ON in accordance with the control signal ΦRn (ΦR1-ΦR4 and ΦRa), the charges accumulated in the FD and the PD are cleared to establish a reset state (standby state for the start of charge accumulation). An output of the AMP is connected to the vertical signal line 501 through a row selection MOS transistor 512. When the row selection MOS transistor 512 is turned ON in accordance with the control signal ΦSn (ΦS1-ΦS4), the output of the AMP is output to the vertical signal line 501.

Figure 19:
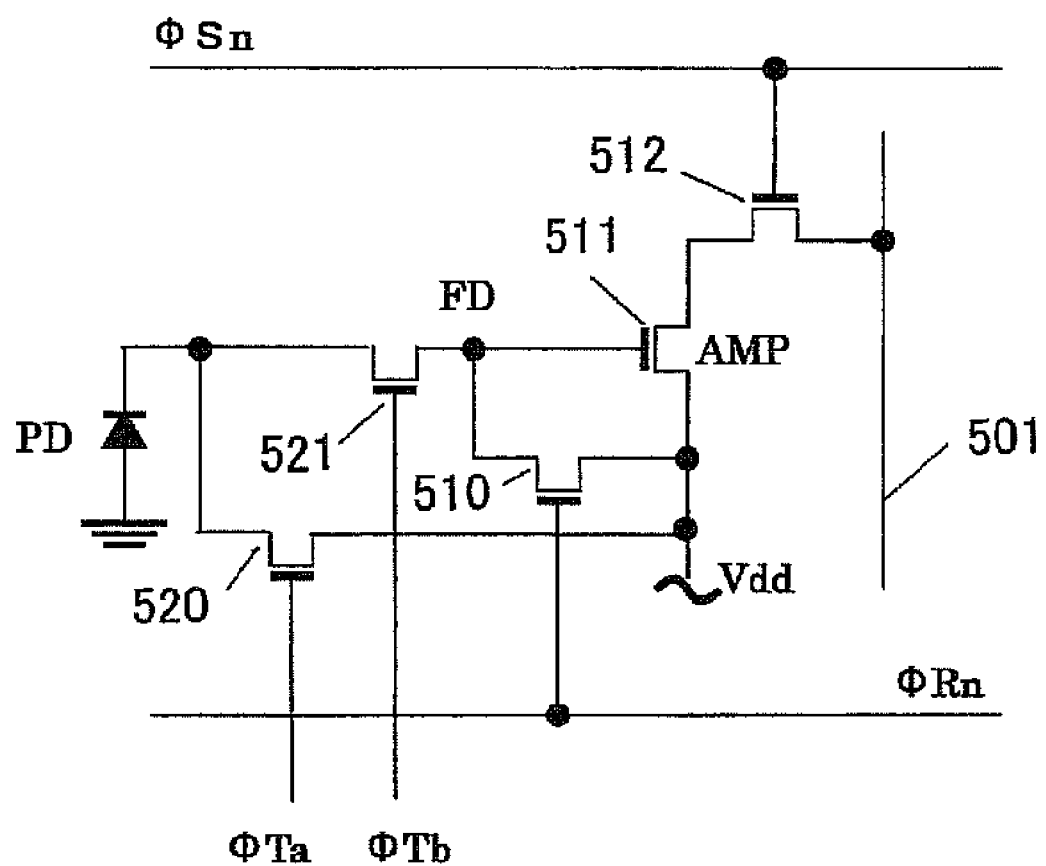
FIG. 19 illustrates a detailed circuit of the focus detection pixel shown in FIG. 17.

FIG. 19 illustrates a detailed circuit of the focus detection pixel shown in FIG. 17. The photoelectric conversion unit is constituted by a photodiode (PD). Charges accumulated in the PD are transferred to a floating diffusion layer (FD) through a transfer MOS transistor 521 which is controlled in accordance with the transfer control signal ΦTb. The FD is connected to a gate of an amplifying MOS transistor (AMP), and the AMP generates a signal corresponding to the amount of charges accumulated in the FD. The FD is also connected to a power source voltage Vdd through a reset MOS transistor 510. When the reset MOS transistor 510 is turned ON in accordance with the control signal ΦRn (ΦR1-ΦR4 and ΦRa), the charges accumulated in the FD are cleared.

The PD is also connected to the power source voltage Vdd through a transfer MOS transistor 520. When the transfer MOS transistor 520 is turned ON in accordance with the transfer control signal ΦTa, the charges accumulated in the PD are cleared to establish a reset state (standby state for the start of charge accumulation). An output of the AMP is connected to the vertical signal line 501 through a row selection MOS transistor 512. When the row selection MOS transistor 512 is turned ON in accordance with the control signal ΦSn (ΦS1-ΦS4), the output of the AMP is output to the vertical signal line 501.

Figure 20:
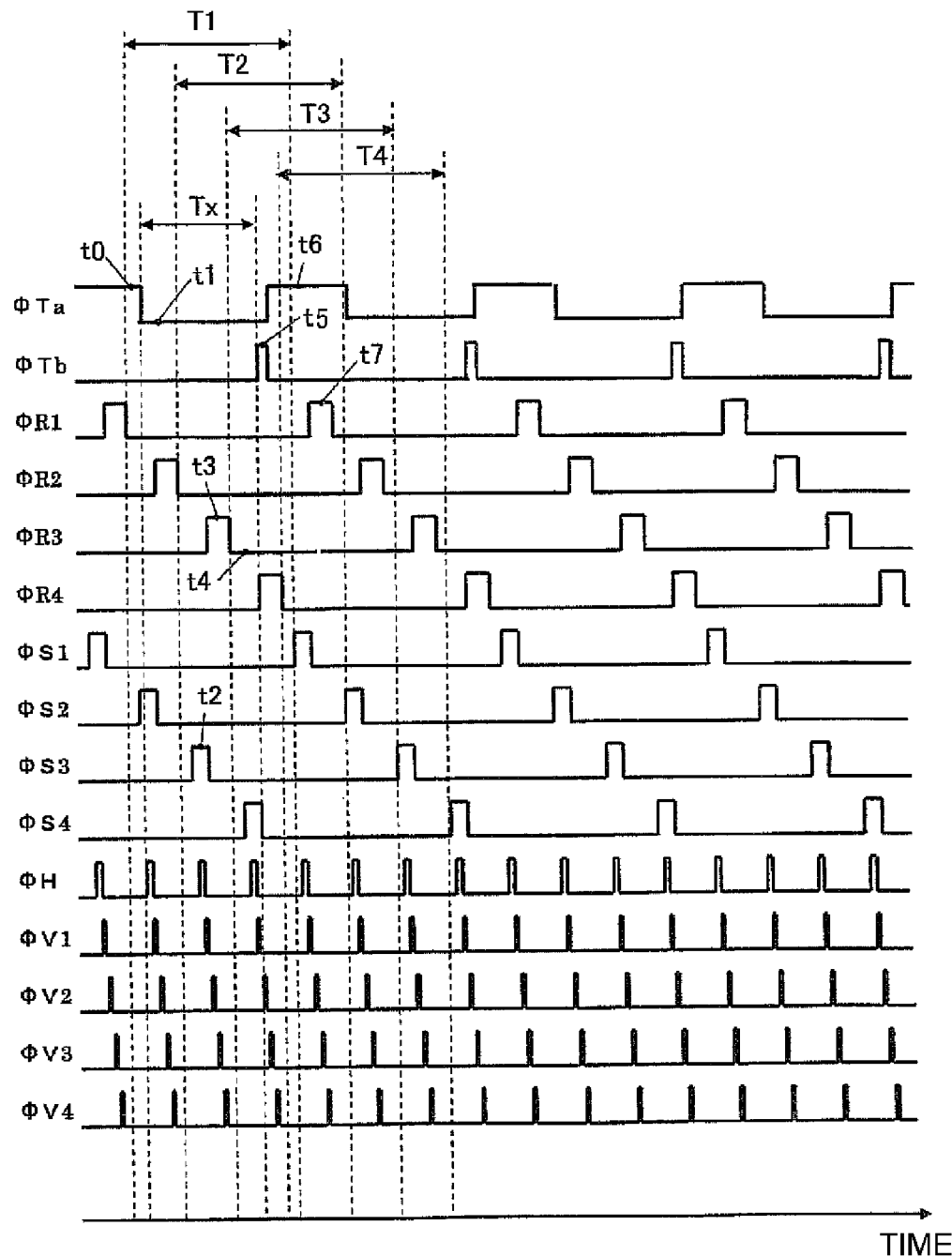
FIG. 20 is a timing chart showing the operation of the image pickup device shown in FIG. 17.

FIG. 20 is a timing chart showing the operation of the image pickup device 212 shown in FIG. 17. The image pickup pixels in the first row are selected in accordance with the control signal ΦS1 issued from the vertical scan circuit 702, and the image signals of the selected image pickup pixels are output to the respective vertical signal lines 501. The image signals of the image pickup pixels in the first row, which have been output to the vertical signal line 501, are temporarily held in the respective signal holding units 701 in accordance with the control signal ΦH that is issued in sync with the control signal ΦS1. The image signals of the image pickup pixels in the first row, which are held in the respective signal holding units 701, are transferred to the output circuit 706 in accordance with the control signals ΦV1-ΦV4 successively issued from the horizontal scan circuit 705, and they are output to the exterior after being amplified at a set amplification degree.

At the time when the transfer of the image signals of the image pickup pixels in the first row to the respective signal holding units 701 has been completed, the image pickup pixels in the first row are reset in accordance with the control signal ΦR1 issued from the accumulation control circuit 703, whereupon a next cycle of charge accumulation of the image pickup pixels in the first row is started. At the time when the outputting of the image signals of the image pickup pixels in the first row from the output circuit has been completed, the image pickup pixels in the second row are selected in accordance with the control signal ΦS2 issued from the vertical scan circuit 702, and the image signals of the selected image pickup pixels are output to the respective vertical signal lines 501. Then, reset and charge accumulation of the image pickup pixels in the second row are performed in a similar manner. Subsequently, outputting, reset, and charge accumulation of the image pickup pixels in the third and fourth rows are performed. Further, the above-described operations are repeated after returning to the first row.

The image signal of each image pickup pixel in the first row corresponds to the amount of charges which have been accumulated in the PD during a time T1 (charge accumulation time) from the fall of the control signal ΦR1 to the rise of the control signal ΦS1. The image signal of each image pickup pixel in the second row corresponds to the amount of charges which have been accumulated in the PD during a time T2 (charge accumulation time) from the fall of the control signal ΦR2 to the rise of the control signal ΦS2. Also, the image signal of each image pickup pixel in the third row corresponds to the amount of charges which have been accumulated in the PD during a time T3 (charge accumulation time) from the fall of the control signal ΦR3 to the rise of the control signal ΦS3. Further, the image signal of each image pickup pixel in the fourth row corresponds to the amount of charges which have been accumulated in the PD during a time T4 (charge accumulation time) from the fall of the control signal ΦR4 to the rise of the control signal ΦS4.

In the focus detection pixel in each row, the amount of charges which have been accumulated in the PD during a time Tx (charge accumulation time) from the fall of the transfer control signal ΦTa to the rise of the transfer control signal ΦTb is transferred to and held in the internal memory of the focus detection pixel in accordance with the rise of the transfer control signal ΦTb, and the PD is reset in accordance with the rise of the transfer control signal ΦTa after the completion of the charge transfer to the internal memory. The image signal held in the internal memory of the focus detection pixel in each row is output to the vertical signal line 501 per row in accordance with the rise of the control signal ΦSn for selecting each row.

Figure 21:
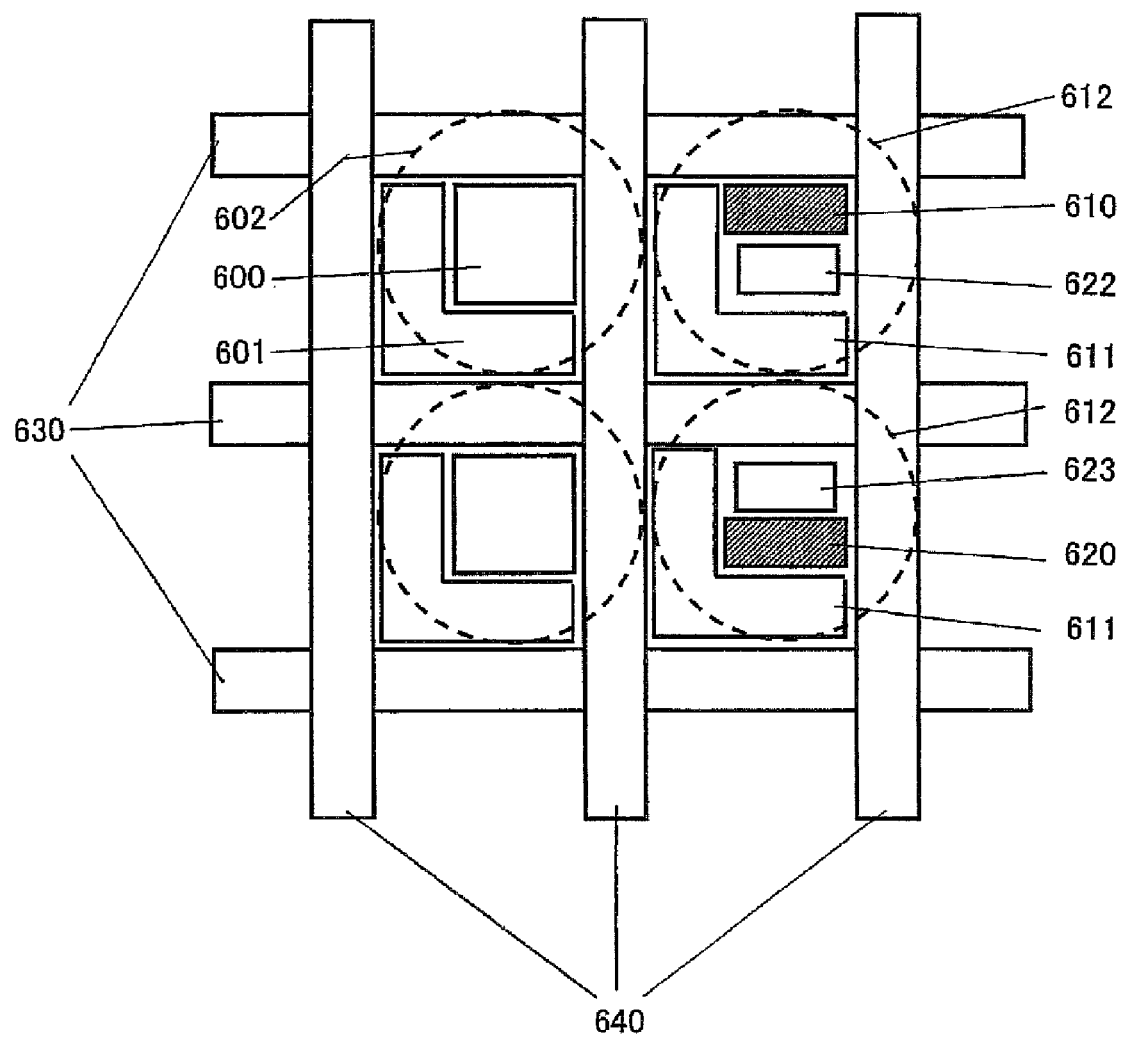
FIG. 21 is a plan view showing, in enlarged scale, a layout of part (two image pickup pixels and two focus detection pixels) of the image pickup device.

FIG. 21 is a plan view showing, in enlarged scale, a layout of part (two image pickup pixels and two focus detection pixels) of the image pickup device 212. In FIG. 21, a broken line represents the microlens. Each of the four pixels is surrounded by a horizontal wiring region 630 and a vertical wiring region 640 in each of which various control signal lines and power source lines are extended. The image pickup pixel is made up of a region 600 positioned just under a microlens 602, in which the PD is arranged, and a region 601 in which a circuit for controlling the PD (including the amplifying MOS transistor, the row selection MOS transistor, the reset MOS transistor, and the wiring) is arranged. To minimize the size of the image pickup pixel, the region 600 and the region 601 are laid out in an area surrounded by the horizontal wiring region 630 and the vertical wiring region 640 without leaving gaps.

The two types of focus detection pixels are made up respectively of a region 622, 623 positioned just under a microlens 612, in which the PD is arranged, a region 610, 620 in which a circuit for controlling the charge accumulation of the PD (including the transfer MOS transistor and the wiring) is arranged, and a region 611 in which a circuit for reading out the image output (the circuit having the same layout as that in the image pickup pixel and including the amplifying MOS transistor, the row selection MOS transistor, the reset MOS transistor, and the wiring) is arranged. The size and the layout of the region 611 in the focus detection pixel are the same as those of the region 601 in the image pickup pixel. The sizes of the regions 622 and 623 in the focus detection pixels are each reduced from that of the region 600 in the image pickup pixel. Such a size difference corresponds to the fact that, as shown in FIG. 13, the region of the light beam received by each focus detection pixel (i.e., the size of the ranging pupil 92, 93) is smaller than the region 94 of the light beam received by the image pickup pixel. The regions 610 and 620 are laid out in respective spaces generated by reducing the sizes of the regions 622 and 623 as compared with the size of the region 600.

Thus, even in the image pickup device in which the charge accumulation is controlled at different charge accumulation timing per pixel array line and the image signals are read out per pixel array line after the end of the charge accumulation, the following advantages are obtained. Since, in a group of focus detection pixels which are arranged over different pixel array lines, the size of the photoelectric conversion unit (corresponding to each region 622, 623 shown in FIG. 21 where the PD is arranged) is reduced and a circuit unit for making the charge accumulation timings in the group of the focus detection pixels coincident with each other is formed in each region 610, 620 generated by the size reduction of the region 622, 623, concurrence of the charge accumulation timings can be maintained in the group of the focus detection pixels so as to prevent deterioration of focus detection accuracy, and the pixel size can be reduced so as to improve image resolution. Stated another way, even in an image pickup device, such as a CMOS image sensor, in which the charge accumulation timing cannot be arbitrarily controlled per pixel, maintaining of the focus detection accuracy and an improvement of the image resolution can be realized at the same time.

Figure 22:
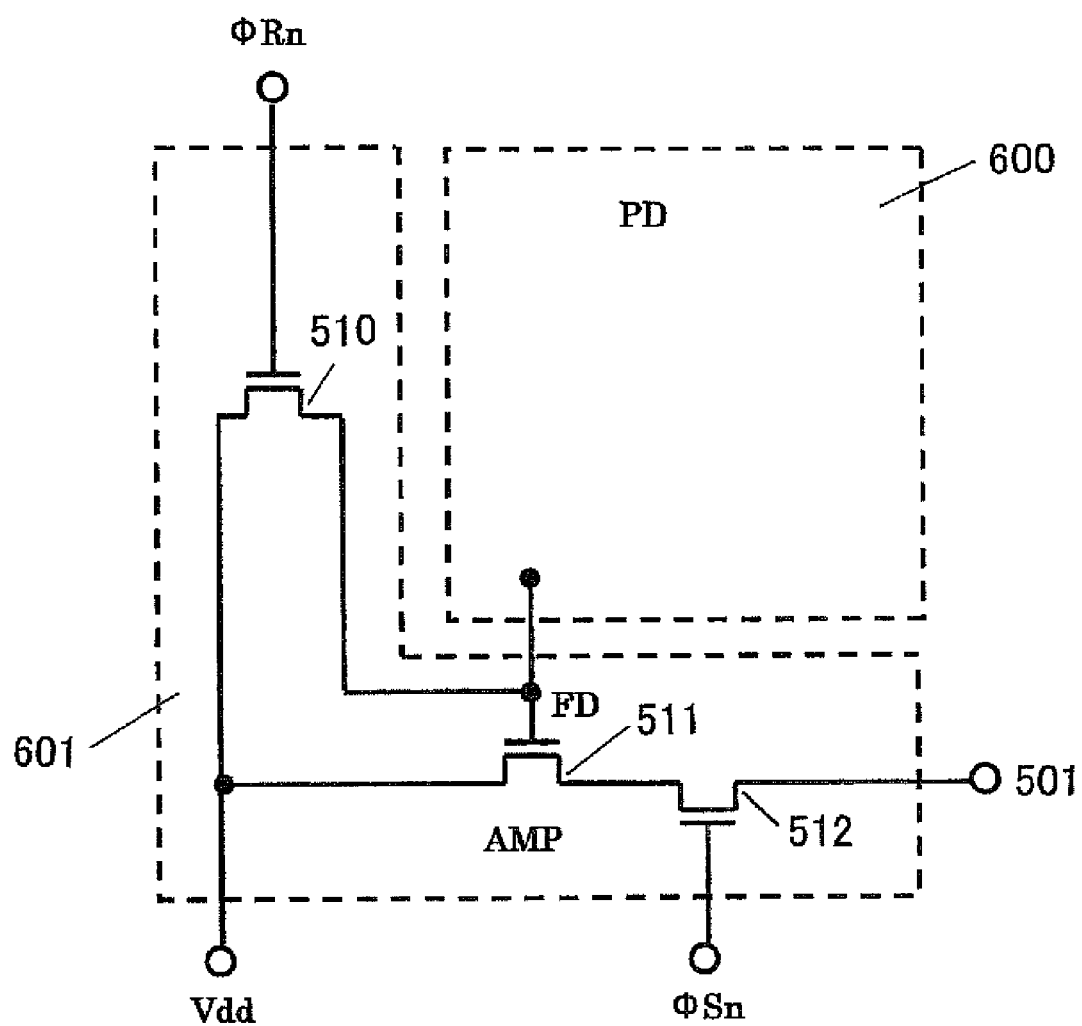
FIG. 22 illustrates a circuit layout of the image pickup pixel.

FIG. 22 illustrates a circuit layout of the image pickup pixel. The PD is arranged in the region 600, and the amplifying MOS transistor 511, the row selection MOS transistor 512, the reset MOS transistor 510, and the wiring are arranged in the region 601.

Figure 23:
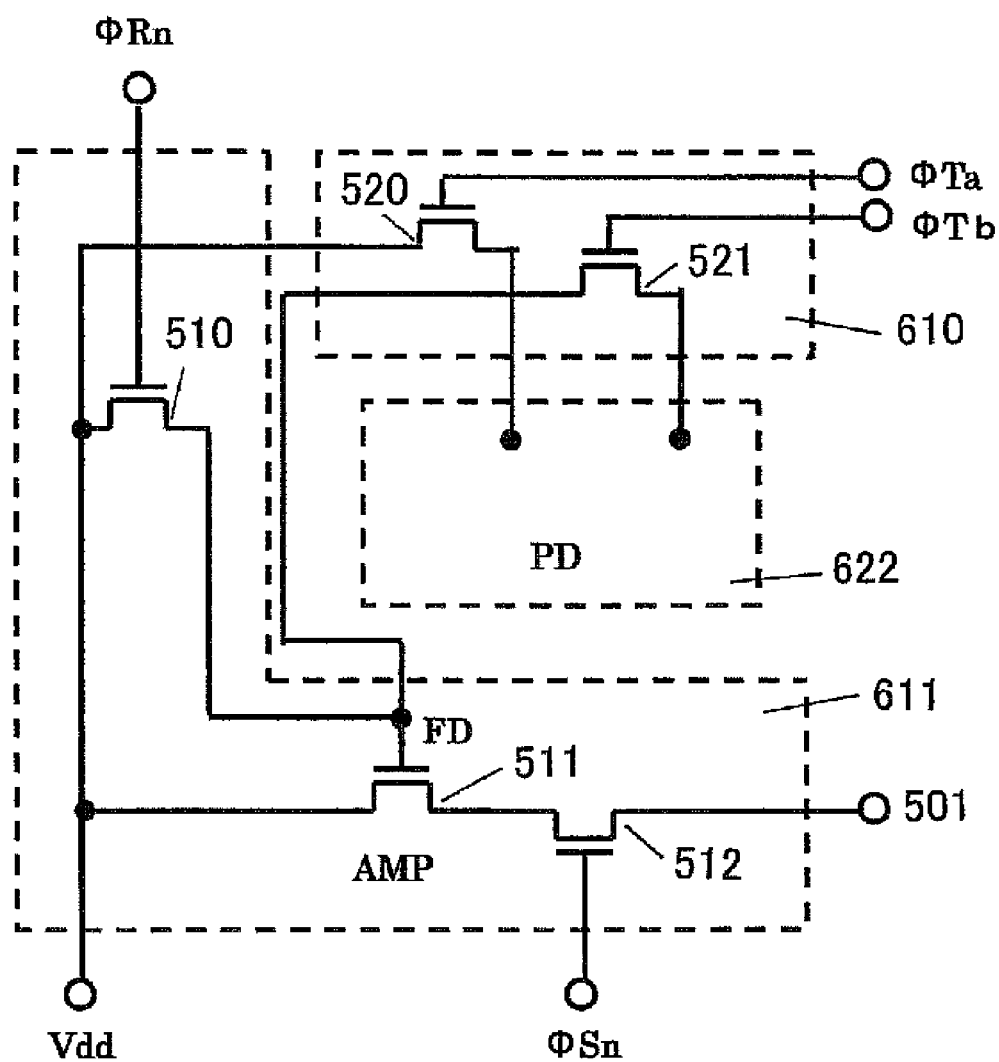
FIG. 23 illustrates a circuit layout of one focus detection pixel.
Figure 24:
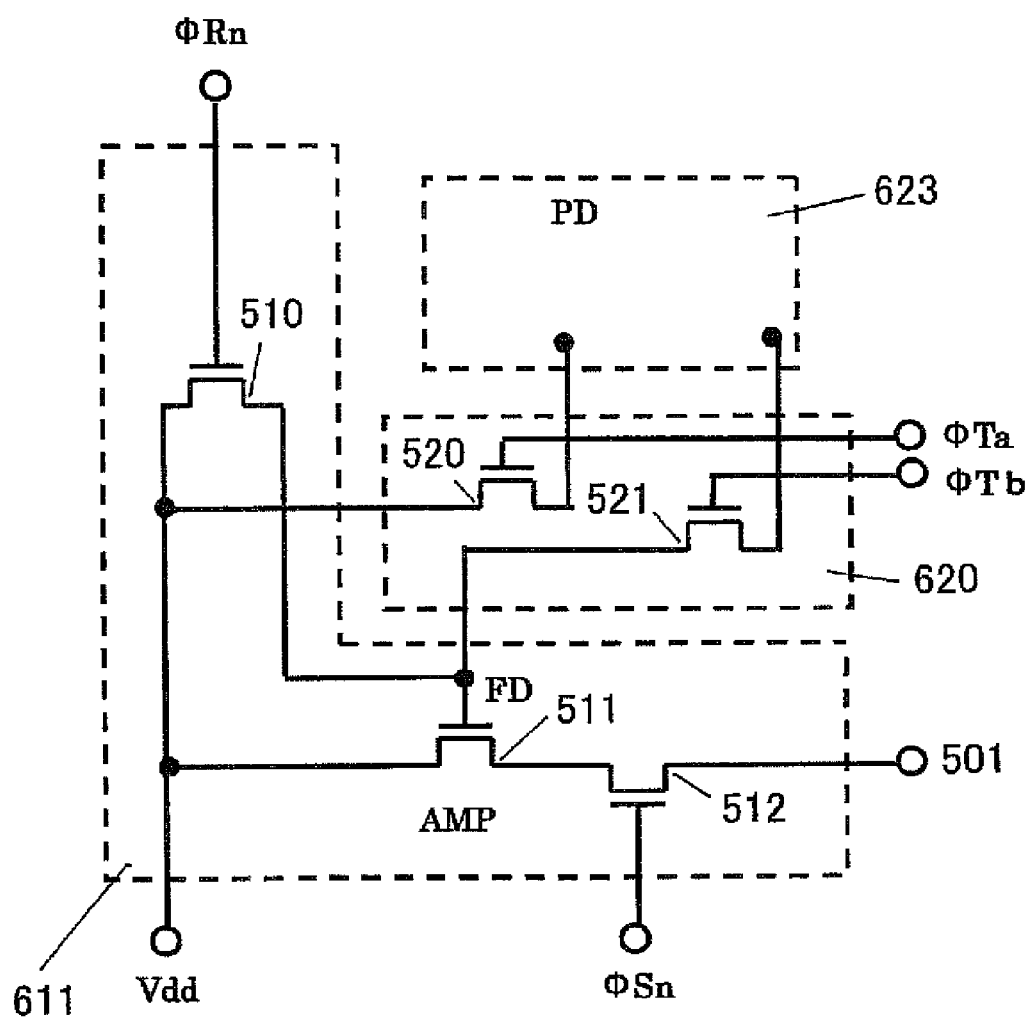
FIG. 24 illustrates a circuit layout of another focus detection pixel.

FIGS. 23 and 24 illustrate respective circuit layouts of the two types of focus detection pixels. The PD is arranged in each of the regions 622 and 623. Also, the amplifying MOS transistor 511, the row selection MOS transistor 512, the reset MOS transistor 510, and the wiring are arranged in the region 611. Further, the transfer MOS transistors 520 and 521 are arranged in each of the regions 610 and 620.

Figure 25:
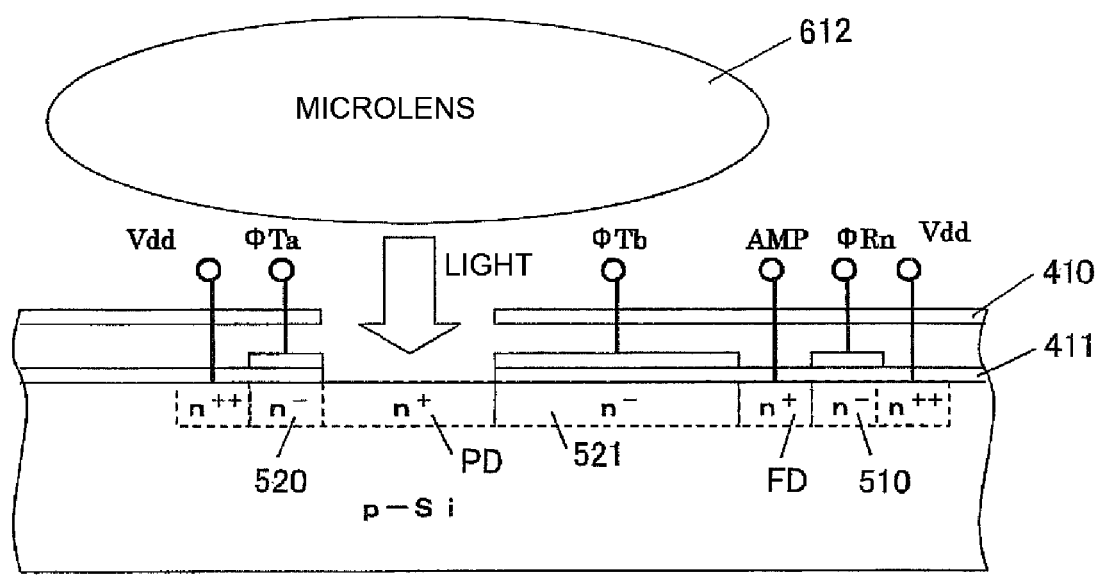
FIG. 25 is a structural sectional view of each of the focus detection pixel shown in FIGS. 23 and 24.

FIG. 25 is a structural sectional view of each of the focus detection pixels shown in FIGS. 23 and 24. The focus detection pixel is constituted by a microlens 612, an aluminum light-shield film 410, wiring and electrodes, an electrical insulating layer 411 (silicon oxide film), and a silicon semiconductor substrate (P-type silicon), which are arranged in the order named as viewed in the incident direction of light. A light beam condensed by the microlens 612 enters the semiconductor substrate after passing through respective openings formed in the light-shield film 410 and the insulating layer 411. An n⁺-region is formed on the surface of a semiconductor unit upon which the light beam is incident, thereby constituting the photodiode PD.

Two n⁻-regions are formed adjacent to the PD and constitute respectively the transfer MOS transistor 520 and the transfer MOS transistor 521 in cooperation with electrodes which are arranged corresponding to the n⁻-regions with the insulating layer 411 interposed therebetween and to which the control signal ΦTa and the control signal ΦTb are applied. Another n⁺-region constituting the floating diffusion (FD) is formed adjacent to the n⁻-region constituting the transfer MOS transistor 521. The FD is connected to the gate of the AMP. Another n⁻-region is formed adjacent to the FD and constitutes the reset MOS transistor 510 in cooperation with an electrode which is arranged corresponding to the n⁻-region with the insulating layer 411 interposed therebetween and to which the control signal ΦRn is applied. An n++-region is formed adjacent to the n−-region constituting each of the reset MOS transistor 510 and the transfer MOS transistor 520. The power source voltage Vdd is connected to the n++-region.

Figure 26:
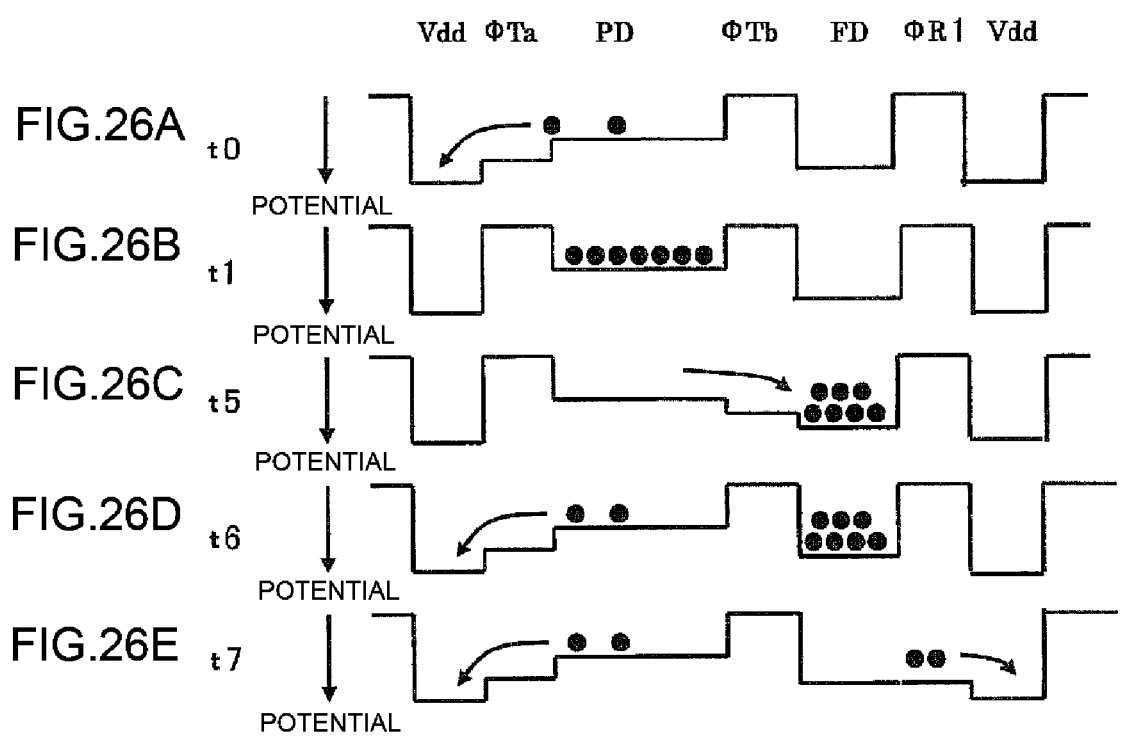
FIGS. 26A-26E are potential charts showing an operation cycle of charge accumulation and signal outputting of the focus detection pixel in a first row.

FIG. 26 is a potential chart showing an operation cycle of the charge accumulation and the signal outputting of the focus detection pixel in the first row (see FIGS. 20 and 25 as well). FIG. 26(*a*) represents the reset (standby=charge non-accumulation) state of the PD and the FD at time t0 (see FIG. 20). In this state, the control signal ΦTa is in a high state (H or ON) and the control signals ΦTb and ΦR1 are each in a low state (L or OFF), whereby charges generated in the PD are discharged to the power source voltage Vdd. Next, FIG. 26(*b*) represents the charge accumulation state of the PD at time t1. In this state, the control signals ΦTa, ΦTb and ΦR1 are each in a low state (L or OFF), whereby charges generated in the PD are accumulated in the PD.

FIG. 26(*c*) represents the state of transfer of the charges, which have been accumulated in the PD, to the FD at time t5. The control signal ΦTb is in a high state (H or ON) and the control signals ΦTa and ΦR1 are each in a low state (L or OFF), whereby the charges accumulated in the PD are transferred to the FD. Thereafter, the row selection signal ΦS1 (not shown) is turned to a high state (H or ON), whereby the image signal corresponding to the amount of charges transferred to the FD is output to the vertical signal line. FIG. 26(*d*) represents the reset (standby=charge non-accumulation) state of the PD at time t6. The control signal ΦTa is in a high state (H or ON) and the control signals ΦTb and ΦR1 are each in a low state (L or OFF), whereby charges generated in the PD are discharged to the power source voltage Vdd. FIG. 26(*e*) represents the reset (standby=charge non-accumulation) state of the FD at time t7. The control signal ΦR1 is in a high state (H or ON) and the control signals ΦTa and ΦTb are each in a low state (L or OFF), whereby charges transferred in the FD are discharged to the power source voltage Vdd.

Figure 27:
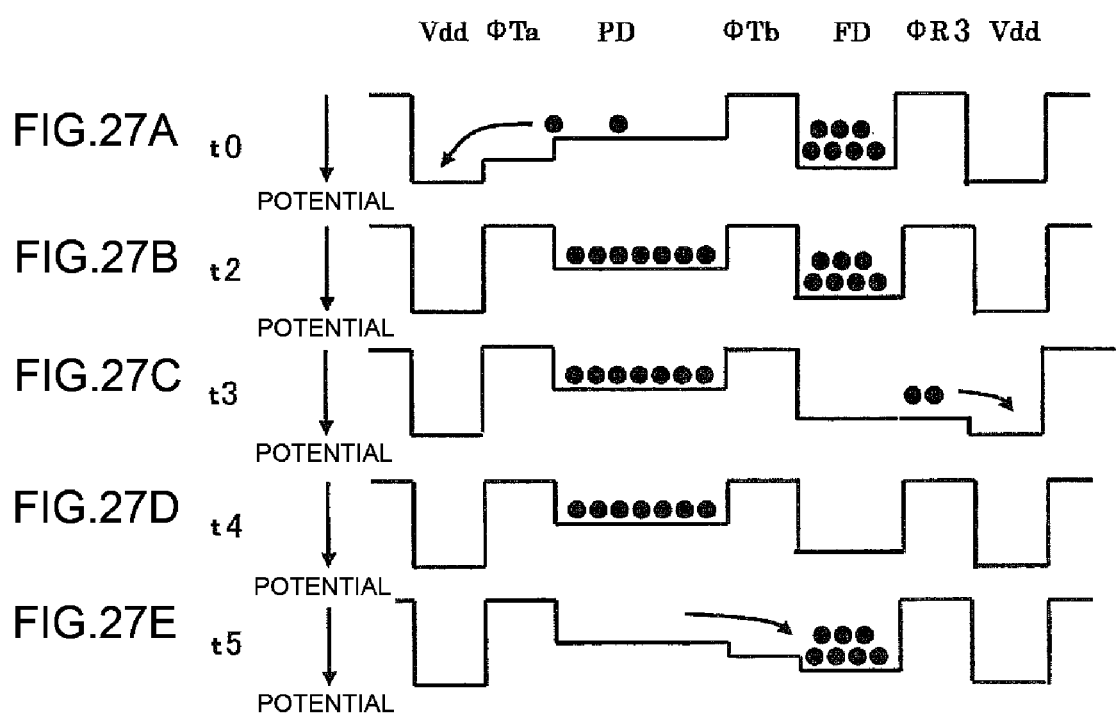
FIG. 27 is a potential chart showing an operation cycle of charge accumulation and signal outputting of the focus detection pixel in a third row.

FIG. 27 is a potential chart showing a cycle of the charge accumulation and the signal outputting of the focus detection pixel in the third row (see FIGS. 20 and 25 as well). FIG. 27(*a*) represents the reset (standby=charge non-accumulation) state of the PD at time t0 (see FIG. 20). The control signal ΦTa is in a high state (H or ON) and the control signals ΦTb and ΦR3 are each in a low state (L or OFF), whereby charges generated in the PD are discharged to the power source voltage Vdd. FIG. 27(*b*) represents the charge accumulation state of the PD at time t2. The control signals ΦTa, ΦTb and ΦR3 are each in a low state (L or OFF), whereby charges generated in the PD are accumulated in the PD. During this state, the row selection signal ΦS3 is held in a high state (H or ON) so that a pixel signal corresponding to the amount of charges, which have been transferred to the FD, is output to the vertical signal line.

FIG. 27(*c*) represents the reset state of the FD and the charge accumulation state of the PD at time t3. The control signal ΦR3 is in a high state (H or ON) and the control signals ΦTa and ΦTb are each in a low state (L or OFF), whereby the charges having been transferred to the FD are discharged to the power source voltage Vdd. FIG. 27(*d*) represents the charge accumulation state of the PD at time t4. The control signals ΦTa, ΦTb and ΦR3 are each in a low state (L or OFF), whereby charges generated in the PD are accumulated in the PD. FIG. 27(*e*) represents the state of transfer of the charges, which have been accumulated in the PD, to the FD at time t5. The control signal ΦTb is in a high state (H or ON) and the control signals ΦTa and ΦR3 are each in a low state (L or OFF), whereby the charges accumulated in the PD are transferred to the FD.

As shown in FIGS. 26 and 27, the charge accumulation timings of the focus detection pixels in respective rows are controlled so as to become the same timing in accordance with the control signals ΦTa and ΦTb, while the read-out of each pixel signal to the vertical signal line is performed at different timing in accordance with the row selection signal ΦSn.

Modifications of Embodiment of Invention

Figure 28:
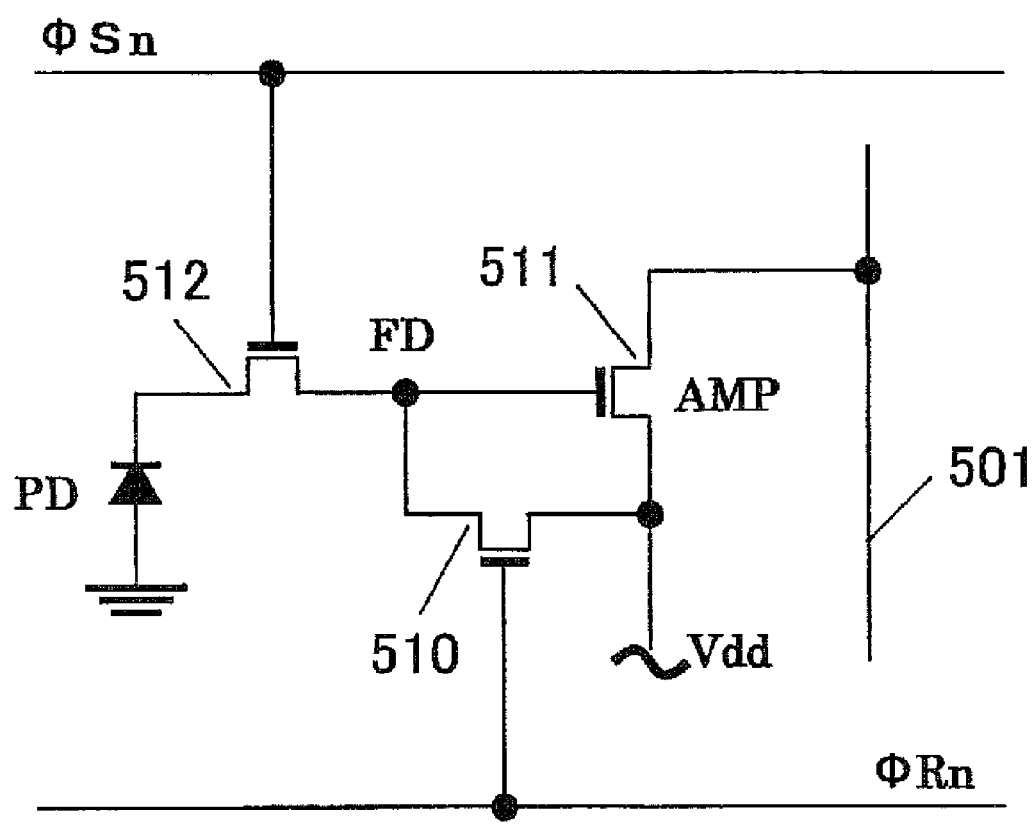
FIG. 28 is a detailed circuit diagram of the image pickup pixel.
Figure 29:
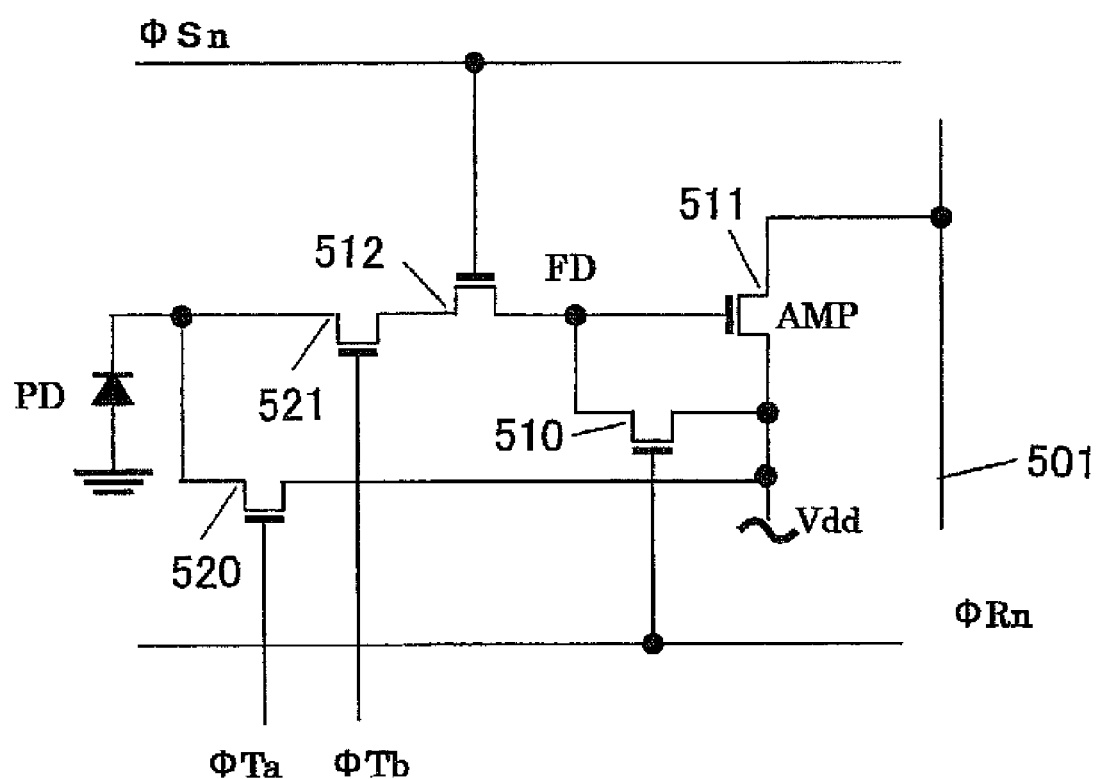
FIG. 29 is a detailed circuit diagram of the focus detection pixel.

FIGS. 28 and 29 are detailed circuit diagrams of the image pickup pixel and the focus detection pixel, respectively. The circuit layouts of the image pickup pixel and the focus detection pixel are not limited to those shown in FIGS. 18 and 19, and they may be modified, for example, as shown in FIGS. 28 and 29. In the circuit layouts shown in FIGS. 18 and 19, the output of the AMP is connected to the vertical signal line 501 through the row selection MOS transistor 512, and when the row selection MOS transistor 512 is turned ON in accordance with the control signal ΦSn (ΦS1-ΦS4), the output of the AMP is output to the vertical signal line 501. By contrast, in the modified circuit layouts shown in FIGS. 28 and 29, the row selection MOS transistor 512 is arranged between the PD and the FD, and the output of the AMP is directly connected to the vertical signal line 501. When the row selection MOS transistor 512 is turned ON in accordance with the control signal ΦSn (ΦS1-ΦS4), the charges accumulated in the PD are transferred to the FD and the output of the AMP is output to the vertical signal line 501 correspondingly.

Figure 30:
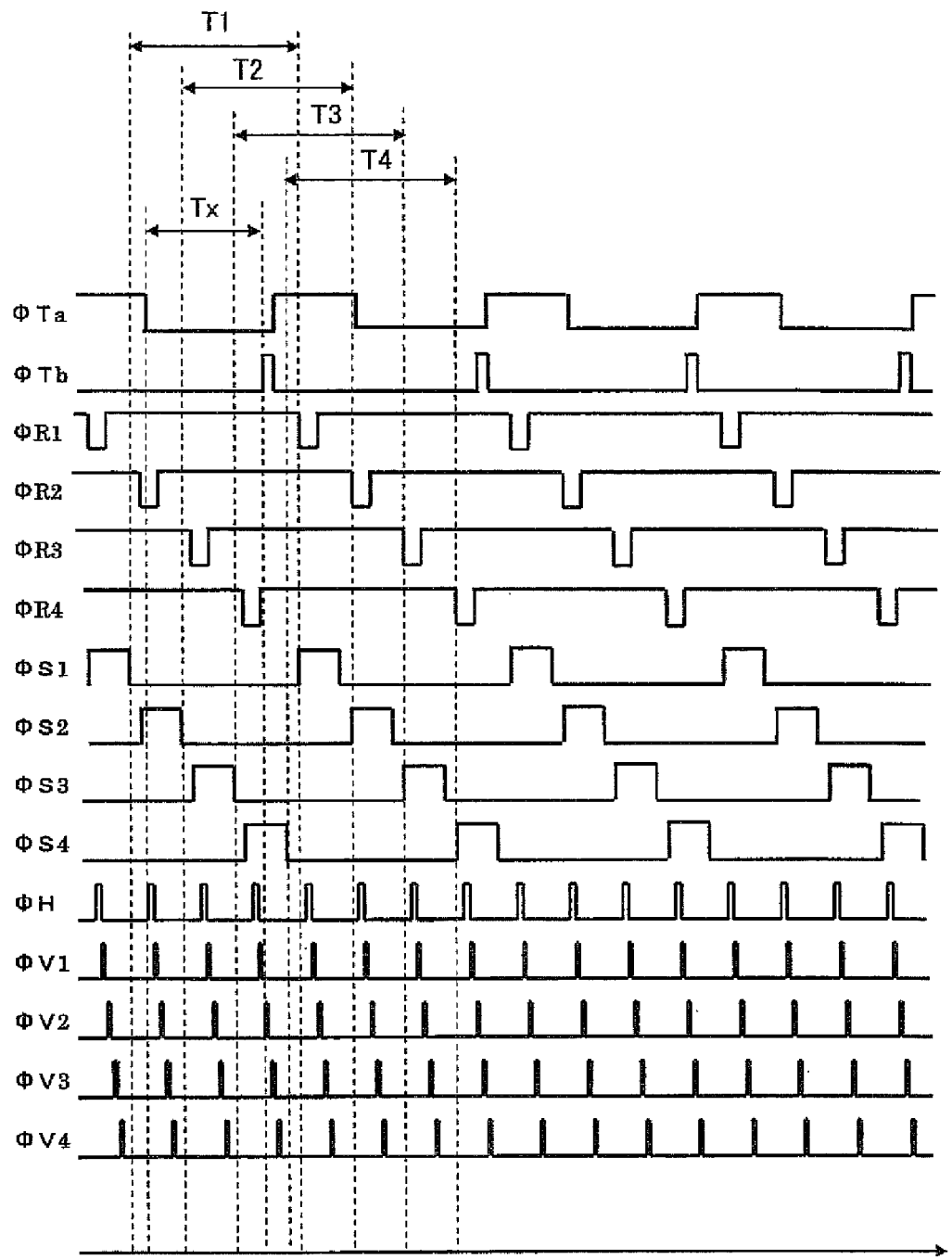
FIG. 30 is a timing chart showing the operation of the image pickup device, shown in FIG. 17, which includes the circuit layouts shown in FIGS. 28 and 29.

FIG. 30 is a timing chart showing the operation of the image pickup device, shown in FIG. 17, which includes the circuit layouts shown in FIGS. 28 and 29. The image pickup pixels in the first row are selected in accordance with the rise of the control signal ΦS1 issued from the vertical scan circuit 702, and the image signals of the selected image pickup pixels are output to the respective vertical signal lines 501. The image signals of the image pickup pixels in the first row, which have been output to the vertical signal line 501, are temporarily held in the respective signal holding units 701 in accordance with the control signal ΦH that is issued in sync with the rise of the control signal ΦS1. The image signals of the image pickup pixels in the first row, which are held in the respective signal holding units 701, are transferred to the output circuit 706 in accordance with the control signals ΦV1-ΦV4 successively issued from the horizontal scan circuit 705, and they are output to the exterior after being amplified in the output circuit 706 at a set amplification degree.

At the time when the transfer of the image signals of the image pickup pixels in the first row to the respective signal holding units 701 has been completed, the PD and the FD in each of the image pickup pixels in the first row are reset in accordance with the rise of the control signal ΦR1 issued from the accumulation control circuit 703, and the charge accumulation in the PD is then started in accordance with the fall of the control signal ΦS1. At the time when the outputting of the image signals of the image pickup pixels in the first row from the output circuit 706 has been completed, the image pickup pixels in the second row are selected in accordance with the rise of the control signal ΦS2 issued from the vertical scan circuit 702, and the image signals of the selected image pickup pixels are output to the respective vertical signal lines 501. Then, reset and charge accumulation of the image pickup pixels in the second row are performed in a similar manner. Subsequently, outputting, reset, and charge accumulation of the image pickup pixels in the third and fourth rows are performed. Further, the above-described operations are repeated after returning to the first row.

The image signal of each image pickup pixel in the first row corresponds to the amount of charges which have been accumulated in the PD during a time T1 (charge accumulation time) from the fall of the control signal ΦS1 to the rise of the control signal ΦS1. The image signal of each image pickup pixel in the second row corresponds to the amount of charges which have been accumulated in the PD during a time T2 (charge accumulation time) from the fall of the control signal ΦS2 to the rise of the control signal ΦS2. Also, the image signal of each image pickup pixel in the third row corresponds to the amount of charges which have been accumulated in the PD during a time T3 (charge accumulation time) from the fall of the control signal ΦS3 to the rise of the control signal ΦS3. Further, the image signal of each image pickup pixel in the fourth row corresponds to the amount of charges which have been accumulated in the PD during a time T4 (charge accumulation time) from the fall of the control signal ΦS4 to the rise of the control signal ΦS4.

In the focus detection pixel in each row, the amount of charges which have been accumulated in the PD during a time Tx (charge accumulation time) from the fall of the transfer control signal ΦTa to the rise of the transfer control signal ΦTb is transferred to and held in the internal memory of the focus detection pixel in accordance with the rise of the transfer control signal ΦTb, and the PD is reset in accordance with the rise of the transfer control signal ΦTa after the completion of the charge transfer to the internal memory. The image signal held in the internal memory of the focus detection pixel in each row is output to the vertical signal line 501 per row in accordance with the rise of the control signal ΦSn for selecting each row.

Figure 31:
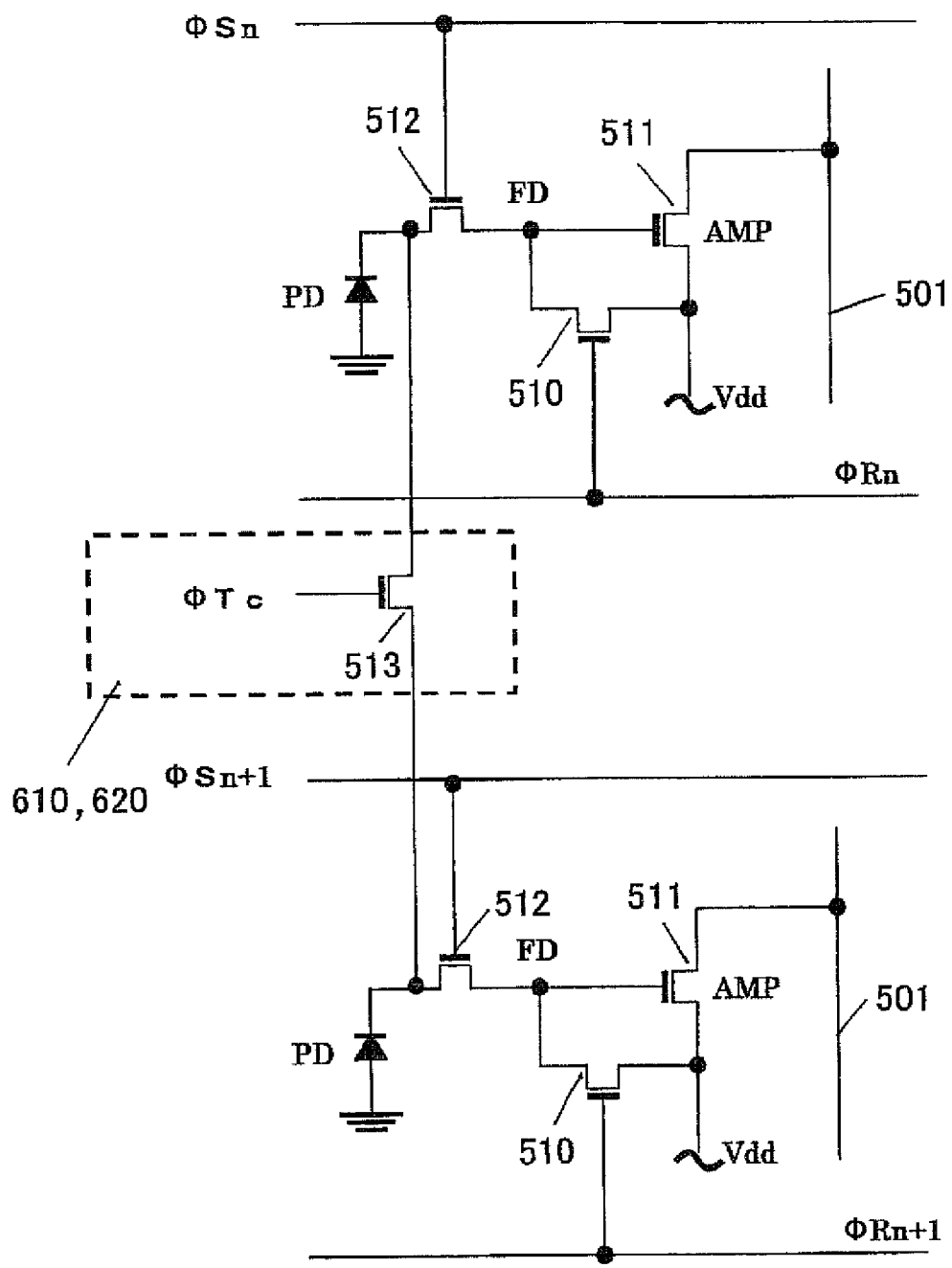
FIG. 31 is a detailed circuit diagram of the focus detection pixel.

FIG. 31 is a detailed circuit diagram of the focus detection pixel. In the focus detection pixel, the circuit arranged in the space generated by reducing the PD size is not limited to the charge accumulation time control circuit for the PD and it may have another circuit layout with the other function. For example, as shown in FIG. 31, a circuit for adding the pixel signals of two focus detection pixels may be arranged in that space.

In FIG. 31, a circuit (transfer MOS transistor 513 and wiring) for adding the pixel signals of the focus detection pixels in the adjacent rows may be arranged in each of the regions 610 and 620. The circuit layout of each focus detection pixel is the same as that shown in FIG. 29. The transfer MOS transistor 513 is directly connected between the PD of the focus detection pixel in the n-th row and the PD of the focus detection pixel in the (n+1)-th row. With such a circuit layout, when the transfer MOS transistor is turned ON by the control signal ΦTc in sync with the timing at which the pixel output of the focus detection pixel in the n-th row is selected by the row selection signal ΦSn, the charges accumulated in the PD of the focus detection pixel in the n-th row and the charges accumulated in the PD of the focus detection pixel in the (n+1)-th row are added and transferred to the FD of the focus detection pixel in the n-th row, and an added pixel output corresponding to the added charges is output to the vertical signal line. The added pixel signal is used for, e.g., the interpolation process of the image data. Thus, adding the pixel signals of the focus detection pixels at a level of the image pickup device can provide data that has higher SN than the case of adding them in post-processing.

Instead of the addition circuit, a subtracting and absolute-value taking circuit may be disposed in each of the regions 610 and 620. An output of the subtracting and absolute-value taking circuit can be used to make in-focus detection in a simplified manner (namely, because outputs of adjacent pixels are substantially equal to each other in the in-focus state, the in-focus detection can be made by detecting that the sum of outputs resulting from the subtracting and absolute-value taking circuits is not larger than a predetermined value).

Additionally, an amplification circuit for amplifying the pixel signal of the focus detection pixel or some other suitable circuit may also be disposed in each of the regions 610 and 620.

While, in FIGS. 4 and 5, the photoelectric conversion units of the image pickup pixel and the focus detection pixel are each shown in a rectangular shape, the shape of the photoelectric conversion unit is not limited to a rectangle and may be designed in some other suitable form. For example, the shape of the image pickup pixel can be made circular or polygonal, and the shape of the focus detection pixel can be made semicircular, elliptic or polygonal.

While FIG. 3 shows, by way of example, the image pickup device in which the focus detection pixels are arrayed in the focus detection area in a closely adjacent relation without an interval therebetween, the focus detection pixels may be arranged at every several pixels. A larger pitch of the focus detection pixels deteriorates the focus detection accuracy to some extent. However, since the density of the focus detection pixels is reduced, image quality after the image interpolation is improved.

While FIG. 3 shows, by way of example, the image pickup device in which the image pickup pixels includes the color filters in the Bayer array, the layout and the array of the color filters are not limited to the illustrated example, and complementary color filters (green: G, yellow: Ye, magenta: Mg, and cyan: Cy) may be employed.

While FIG. 3 shows, by way of example, the image pickup device in which the focus detection pixel does not include a color filter, the present invention can also be applied to the case the focus detection pixel includes one (e.g., a green filter) of color filters having the same colors for those of the color filters used in the image pickup pixels.

While FIG. 3 shows, by way of example, the image pickup device in which the image pickup pixels and the focus detection pixels are arranged in a dense tetragonal lattice array, they may be arranged in a dense hexagonal lattice array.

The one embodiment has been described above, by way of example, in connection with the focus detection device using the microlens type pupil-split phase difference detection method, in which each of the image pickup pixels and the focus detection pixels on the image pickup device has the microlens. However, the present invention can also be applied to a focus detection device using a polarization type pupil-split phase difference detection method, which includes a pupil-split polarization member for dividing light, which comes from an object and passes through an exit pupil of a photographic optical system, into a pair of light beams differing in centroid and polarization characteristics, and a image pickup device having pixels which selectively receive the pair of light beams and are arranged in a two-dimensional pattern.

While the corrected image data is stored in the memory card in the flowchart showing the image pickup operation shown in FIG. 14, the corrected image data may be displayed on the electronic viewfinder or a backside monitor screen (not shown) which is disposed on the backside of the body.

The image pickup apparatus to which the present invention can be applied is not limited to a digital still camera and a film camera in which an interchangeable lens is detachably mounted to a camera body. The present invention is also applicable to a lens-integrated digital still camera and a film camera, or a video camera. Further, the present invention can be applied to a miniature camera module built in a cell phone, etc., and a monitoring camera. Application examples other than cameras include a focus detection device, a ranging (distance measuring) device, and a stereoscopic ranging device.

It is obvious that the present invention is not limited to the above-described embodiment, but can be applied to, for example, motorcycles or three-wheeled vehicles without limiting to the saddle-ride type four-wheeled vehicles, and various modifications can be made in a range without departing from the gist of the invention.

What is claimed as new and is desired to be secured by Letters Patent of the United States is:

1. An image pickup device comprising:
a pixel unit comprising first pixels and second pixels;
a first photoelectric conversion unit configured to generate charges corresponding to light incident upon each of the first pixels;
a first control unit connected to the first photoelectric conversion unit and configured to control the first photoelectric conversion unit;
a second photoelectric conversion unit configured to generate charges corresponding to light incident upon each of the second pixels, the second photoelectric conversion unit being smaller than the first photoelectric conversion unit; and
a second control unit connected to the second photoelectric conversion unit and configured to control the second photoelectric conversion unit, the second control unit being arranged in a space which is generated due to a size difference between the first photoelectric conversion unit and the second photoelectric conversion unit, wherein the second photoelectric conversion unit and the second control unit are arranged within the second pixel.

2. The image pickup device according to claim 1, wherein the first control unit is configured to perform charge accumulation control of the first photoelectric conversion unit, and the second control unit is configured to perform charge accumulation control of the second photoelectric conversion unit.

3. The image pickup device according to claim 2, wherein the first control unit is provided in each of the first pixels.

4. The image pickup device according to claim 3, further comprising:
a third control unit connected to the first control unit and configured to control timing of causing each first control unit to perform charge accumulation for each of plural lines extending in a direction in which the first and second pixels are arrayed, the timing of the charge accumulation being different among the plural lines.

5. The image pickup device according to claim 2, further comprising:
a fourth control unit connected to the second control unit and configured to synchronize timing at which each second control unit causes the second photoelectric conversion unit to perform charge accumulation.

6. The image pickup device according to claim 3, further comprising:
a fifth control unit connected to the first control unit and the second control unit and configured to control timing of causing each of the first control unit and the second control unit to output a signal corresponding to accumulated charges for each of plural lines extending in a direction in which the first and second pixels are arrayed, the timing being different among the plural lines, the second pixels being arranged in different lines among the plural lines.

7. The image pickup device according to claim 6, wherein the second control unit is configured to complete the charge accumulation in the plural second photoelectric conversion units arranged in the plural lines before the fifth control unit performs the control to start outputting the signal.

8. The image pickup device according to claim 6, wherein the second control unit has a charge holding unit configured to temporarily hold the charges accumulated in the second photoelectric conversion unit, and wherein the second control unit is configured to output a signal corresponding to the charges held in the charge holding unit under control of the fifth control unit.

9. The image pickup device according to claim 1, wherein a positional relationship between the second photoelectric conversion unit and the second control unit differs between the second pixels arranged adjacent to each other.

10. The image pickup device according to claim 1, wherein the second pixels comprises a first focus detection pixel and a second focus detection pixel which are arranged next to each other, the second photoelectric conversion unit in the first focus detection pixel is configured to receive one of a pair of light beams passed through an exit pupil of an imaging optical system, and the second photoelectric conversion unit in the second focus detection pixel is configured to receive another of the pair of light beams passed through the exit pupil of the imaging optical system.

11. The image pickup device according to claim 1, wherein each of the first pixels has a size substantially equal to a size of each of the second pixels.

12. The image pickup device according to claim 1, wherein each of the first pixels includes a color filter and each of the second pixels does not include a color filter.

13. The image pickup device according to claim 1, wherein each of the first pixels and each of the second pixels include a microlense, respectively.

14. The image pickup device according to claim 1, wherein the image pickup device is a CMOS image sensor.

15. A focus detection device comprising:
the pickup device according to claim 10; and
a focus detection unit configured to detect a focus adjusting state of the imaging optical system based on signals output from the second photoelectric conversion units of the second pixels.

16. An image pickup apparatus comprising:
the focus detection device according to claim 15;
a focus adjustment unit configured to perform focus adjustment of the imaging optical system based on the focus adjusting state detected by the focus detection device; and
a recording unit configured to record an image captured by the image pickup device.

17. A method for manufacturing an image pickup device, comprising:
providing a pixel unit comprising first pixels and second pixels;
providing a first photoelectric conversion unit configured to generate charges corresponding to light incident upon each of the first pixels;
providing a first control unit configured to control the first photoelectric conversion unit;
providing a second photoelectric conversion unit configured to generate charges corresponding to light incident upon each of the second pixels, the second photoelectric conversion unit being smaller than the first photoelectric conversion unit; and
providing a second control unit configured to control the second photoelectric conversion unit, the second control unit being arranged in a space which is generated due to a size difference between the first photoelectric conversion unit and the second photoelectric conversion unit, wherein the second photoelectric conversion unit and the second control unit are arranged within the second pixel.

18. The method for manufacturing the image pickup device according to claim 17, wherein the first control unit performs charge accumulation control of the first photoelectric conversion unit, and the second control unit performs charge accumulation control of the second photoelectric conversion unit.

19. The method for manufacturing the image pickup device according to claim 18, further comprising:
providing the first control unit in each of the first pixels.

20. The method for manufacturing the image pickup device according to claim 19, further comprising:
providing a third control unit configured to control timing of causing each first control unit to perform charge accumulation for each of plural lines extending in a direction in which the first and second pixels are arrayed, the timing of the charge accumulation being different among the plural lines.

21. The method for manufacturing the image pickup device according to claim 18, further comprising:
providing a fourth control unit configured to synchronize timing at which each second control unit causes the second photoelectric conversion unit to perform charge accumulation.

22. The method for manufacturing the image pickup device according to claim 18, further comprising:
providing a fifth control unit configured to control timing of causing each of the first control unit and the second control unit to output a signal corresponding to accumulated charges for each of plural lines extending in a direction in which the first and second pixels are arrayed, the timing being different among the plural lines, the second pixels being arranged in different lines among the plural lines.

23. The method for manufacturing the image pickup device according to claim 22, wherein the second control unit completes the charge accumulation in the plural second photoelectric conversion units arranged in the plural lines before the fifth control unit performs the control to start outputting the signal.

24. The method for manufacturing the image pickup device according to claim 22, further comprising:
providing, in the second control unit, a charge holding unit configured to temporarily hold the charges accumulated in the second photoelectric conversion unit.

25. The method for manufacturing the image pickup device according to claim 17, further comprising:
setting a positional relationship between the second photoelectric conversion unit and the second control unit to be different between the second pixels arranged adjacent to each other.

26. The method for manufacturing the image pickup device according to claim 17, further comprising:
providing the second photoelectric conversion unit such that one second photoelectric conversion unit provided in one of the second pixels receives one of a pair of light beams passed through an exit pupil of an imaging optical system and another second photoelectric conversion unit provided in another of the second pixels receives another of the pair of light beams passed through the exit pupil of the imaging optical system.

27. The method for manufacturing the image pickup device according to claim 17, further comprising:
forming the first pixel and the second pixel to have sizes substantially equal to each other.

28. The method for manufacturing the image pickup device according to claim 17, further comprising:
providing a color filter in each of the first pixels while not providing a color filter in each of the second pixels.

29. The method for manufacturing the image pickup device according to claim 17, further comprising:
providing microlenses in each of the first pixels and each of the second pixels.

30. The method for manufacturing the image pickup device according to claim 17, wherein the image pickup device is a CMOS image sensor.

31. A method for manufacturing a focus detection device, comprising:
providing the image pickup device manufactured by the method according to claim 17; and
providing a focus detection unit configured to detect a focus adjusting state of the imaging optical system based on signals output from the second photoelectric conversion units of the second pixels.

32. A method of manufacturing an image pickup apparatus, comprising:
providing the focus detection device manufactured by the method according to claim 31;
providing a focus adjustment unit configured to perform focus adjustment of the imaging optical system based on the focus adjusting state detected by the focus detection device; and
providing a recording unit configured to record an image captured by the image pickup device.

33. An image pickup device comprising:
a pixel unit comprising first pixels and second pixels;
first photoelectric conversion means for generating charges corresponding to light incident upon each of the first pixels;
first control means for controlling the first photoelectric conversion means;
second photoelectric conversion means for generating charges corresponding to light incident upon each of the second pixels, the second photoelectric conversion means being smaller than the first photoelectric conversion means; and
second control unit means for controlling the second photoelectric conversion means, the second control means being arranged in a space which is generated due to a size difference between the first photoelectric conversion means and the second photoelectric conversion means,
wherein the second photoelectric conversion unit and the second control unit are arranged within the second pixel.

34. The image pickup device according to claim 33, wherein the second pixels comprises a first focus detection pixel and a second focus detection pixel which are arranged next to each other, second photoelectric conversion means in the first focus detection pixel is for receiving one of a pair of light beams passed through an exit pupil of an imaging optical system, and second photoelectric conversion means in the second focus detection pixel is for receiving another of the pair of light beams passed through the exit pupil of the imaging optical system.

35. A focus detection device comprising:
the pickup device according to claim 34; and
focus detection means for detecting a focus adjusting state of the imaging optical system based on signals output from the second photoelectric conversion means of the second pixels.

36. An image pickup apparatus comprising:
the focus detection device according to claim 35;

a focus adjustment means for performing focus adjustment of the imaging optical system based on the focus adjusting state detected by the focus detection means; and recording means for recording an image captured by the image pickup device.

37. The image pickup device according to claim 1, wherein:
- a first pixel of the first pixels contains a first area therein, the first pixel including the first photoelectric conversion unit provided within the first area, the first photoelectric conversion unit substantially filling the first area; and
- a second pixel of the second pixels contains a second area, the second area being a same size as the first area, the second pixel including the second photoelectric conversion unit and the second control unit both being provided within the second area.

38. The image pickup device according to claim 37, wherein the second area is provided a location within the second pixel that corresponds to a location of the first area within the first pixel.

39. An image pickup device comprising:
- a pixel unit comprising first pixels and second pixels;
- a first photoelectric conversion unit configured in each of the first pixels to generate charges corresponding to light incident upon each of the first pixels;
- a first control unit connected to the first photoelectric conversion unit and configured to control the first photoelectric conversion unit in each of the first pixels;
- a second photoelectric conversion unit configured to each of the second pixels to generate charges corresponding to light incident upon each of the second pixels, the second photoelectric conversion unit being smaller than the first photoelectric conversion unit;
- a second control unit connected to the second photoelectric conversion unit and configured to control the second photoelectric conversion unit in each of the second pixels, the second control unit being arranged in each of the second pixels at a position corresponding to the first control unit in each of the first pixels; and
- an additional control unit connected to the second photoelectric conversion unit and configured to control the second photoelectric conversion unit in each of the second pixels, the additional control unit being arranged in each of the second pixels in a space that is generated due to a size difference between the first photoelectric conversion unit and the second photoelectric conversion unit.

40. The image pickup device according to claim 39, wherein
the first pixels are each an image pickup pixels; and
the second pixels are each a focus detection pixel.

41. The image pickup device according to claim 40, wherein
the first control unit is configured to perform charge accumulation control of the first photoelectric conversion unit and to read out an image output of the image pickup pixel, the additional control unit is configured to perform charge accumulation control of the second photoelectric conversion unit, and the second control unit is configured to read out an image output of the focus detection pixel.

42. The image pickup device according to claim 41, wherein
the additional control unit is configured to synchronize timing, in accordance with a control signal applied, at which the additional control unit causes the second photoelectric conversion unit to perform charge accumulation.

43. The image pickup device according to claim 42, wherein
the second control unit is provided at a location within each of the second pixels that corresponds to a location of the first control unit within each of the first pixels; and
the second photoelectric conversion unit and the additional control unit are provided at a location within each of the second pixels that corresponds to a location of the first photoelectric conversion unit within each of the first pixels.

* * * * *